US012517961B2

(12) United States Patent
Marikar et al.

(10) Patent No.: US 12,517,961 B2
(45) Date of Patent: Jan. 6, 2026

(54) WEB SERVICES FOR DATA AGGREGATION AND APPLICATION FOR PATH TRAVERSAL IN KNOWLEDGE GRAPHS

(71) Applicant: ROYAL BANK OF CANADA, Toronto (CA)

(72) Inventors: Mohamed Marikar, Toronto (CA); Jiahao Sun, Toronto (CA); Jiaxing Tong, Toronto (CA); Ryan Jayakody, Toronto (CA); Derek Burandt, Toronto (CA); Jayasree Gupta, Toronto (CA); Prashanth Rao, Toronto (CA); Yizhe Wen, Toronto (CA); Adam James Guiducci, Toronto (CA); Chen Hang Wang, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 699 days.

(21) Appl. No.: 17/471,010

(22) Filed: Sep. 9, 2021

(65) Prior Publication Data

US 2022/0075833 A1 Mar. 10, 2022

Related U.S. Application Data

(60) Provisional application No. 63/076,205, filed on Sep. 9, 2020.

(51) Int. Cl.
*G06F 16/953* (2019.01)
*G06F 16/2457* (2019.01)
*G06F 16/9538* (2019.01)

(52) U.S. Cl.
CPC ...... *G06F 16/953* (2019.01); *G06F 16/24578* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 10,083,236 B2 * | 9/2018 | Crosby | G06F 16/219 |
| 2004/0249809 A1 * | 12/2004 | Ramani | G06F 16/5854 |
| 2012/0310926 A1 * | 12/2012 | Gannu | G06F 16/24578 707/723 |
| 2015/0039611 A1 * | 2/2015 | Deshpande | G06F 16/285 707/737 |
| 2015/0242406 A1 * | 8/2015 | Singh | G06F 16/27 707/723 |
| 2015/0310016 A1 * | 10/2015 | Lamkhede | G06F 16/374 707/706 |
| 2016/0255139 A1 * | 9/2016 | Rathod | H04N 1/32101 709/203 |
| 2016/0379120 A1 * | 12/2016 | Merdivan | G06F 16/3344 706/46 |

(Continued)

*Primary Examiner* — Khanh B Pham
*Assistant Examiner* — Navneet Gmahl
(74) *Attorney, Agent, or Firm* — Norton Rose Fulbright Canada LLP

(57) ABSTRACT

Embodiments generally relate to real-time profile search interfaces and web services with the ability to real-time search for and view details on entities and visualizations of the network. The computer service enables real-time profile search of entities and performs a sequence of data aggregation heuristics to present a consolidated view of an individual.

21 Claims, 15 Drawing Sheets

(56) References Cited

U.S. PATENT DOCUMENTS

| | | | |
|---|---|---|---|
| 2017/0061324 A1* | 3/2017 | Glass | G06N 5/046 |
| 2018/0039696 A1* | 2/2018 | Zhai | G06F 16/9024 |
| 2018/0052884 A1* | 2/2018 | Kale | G06F 16/242 |
| 2018/0068031 A1* | 3/2018 | Hewavitharana | G06F 9/30156 |
| 2018/0107917 A1* | 4/2018 | Hewavitharana | G06F 16/2468 |
| 2018/0144233 A1* | 5/2018 | Chen | G06K 19/06009 |
| 2018/0232450 A1* | 8/2018 | Bivens | G06F 16/93 |
| 2018/0349517 A1* | 12/2018 | Kleiman-Weiner | G06N 5/022 |
| 2019/0074987 A1* | 3/2019 | Wiener | H04L 12/1831 |
| 2019/0361934 A1* | 11/2019 | Rogynskyy | G06Q 10/1095 |
| 2019/0362290 A1* | 11/2019 | Rogynskyy | G06N 5/025 |
| 2020/0257730 A1* | 8/2020 | Srinivas | G06N 5/022 |
| 2020/0372075 A1* | 11/2020 | Rogynskyy | G06F 40/295 |
| 2021/0089620 A1* | 3/2021 | Finkelshtein | G10L 15/19 |
| 2021/0248321 A1* | 8/2021 | Cheng | G06F 16/954 |
| 2021/0256485 A1* | 8/2021 | Fidanza | G06Q 30/0201 |
| 2022/0035832 A1* | 2/2022 | Kannan | G06F 16/24578 |
| 2022/0075833 A1* | 3/2022 | Marikar | G06F 16/953 |
| 2022/0300523 A1* | 9/2022 | Jain | G06Q 10/0635 |

* cited by examiner

WEB SERVICES FOR DATA AGGREGATION AND APPLICATION FOR PATH TRAVERSAL IN KNOWLEDGE GRAPHS

FIELD

The improvements generally relate to the field of web applications and improved user interfaces.

INTRODUCTION

There is a need for mechanisms to efficiently retrieve and consolidate data about entities (e.g., organizations, individuals) from multiple data sources.

Existing applications are limited because they only show profiles of a single person and direct relationships between this person and other profiles, and have very little capability to illustrate connections between two profiles that do not have any direct relationships. There is a need for mechanisms to view indirect connections between two individuals.

Existing applications are also limited as they do not focus on relationships with locations, institutions, or areas of interest. There is a need for mechanisms to view indirect connections between individuals based on relationships with non-persons, for example, a shared alma mater.

Identifying entities as prospective new clients can be a time consuming activity requiring a lot of research both to identify new targets and to sufficiently profile such targets in order to decide on a sales approach. There is a need for systems and methods to automate and improve prospect research alongside related pre-sales activities using natural language processing.

SUMMARY

Embodiments described herein provide systems, methods, and computer products for retrieving data from multiple data sources, determining whether the data refer to the same entity, consolidating the data into a single data record about the entity, building a search engine to retrieve consolidated data, generating a knowledge graph of connections between entities, and path traversal in the knowledge graph to discover and rank paths connecting to the entity. Systems, methods, and computer products provide an interface with visualizations for the consolidated data, connections between entities, and an interactive network.

Embodiments described herein provide a system for real-time profile search for web services. The system has: a memory storing a data record, a data aggregation service having a matching model to aggregate multiple sources of data into the data record, an entity recognition service to classify entity types, a search engine to retrieve entities, and a knowledge graph of nodes and edges representing connections between entities. The system has a processor coupled to the memory with instructions for an interface to display a real-time profile for an entity with visual elements extracted from the data record, the processor executing instructions to determine whether a set of data sources refers to the entity using the entity recognition service and the search engine and aggregate the set of data sources to populate the data record using the data aggregation service having the matching model, wherein the processor pre-processes the consolidated data and prepares the data for the search engine. The processor executes a computer application for path traversal in the knowledge graph to discover a path to connect to the entity using ranking code, and updating the interface with a visual element corresponding to at least a portion of the path.

In some embodiments, the interface receives a name query, wherein the processor computes the entity and the set of data sources using the name query and the matching model.

In some embodiments, the processor locates a first data set result and a second data set result from the set of data sources using the name query, wherein the processor prompts the interface for a supplemental query, and generates the data record using the supplemental query and the matching model.

In some embodiments, the processor uses data aggregation logic to consolidate results generated by the matching model to populate the profile with the consolidate results.

In some embodiments, the processor locates a first data set result and a second data set result from the set of data sources and populates the data record using data extraction from the first data set result and the second data set result, field mapping of a field from the first data set result and another field from the second data set result, and entity matching by merging values from the first data set result and the second data set result.

In some embodiments, the processor determines whether the set of data sources refer to the entity and aggregates the set of data sources to populate the data record by extracting a first data record from a first data source and a second data record from a second data source, mapping the first data record and the second data record using the matching model, and merging a portion of the first data record and a portion of the second data record to populate the data record.

In some embodiments, the processor reads the consolidated data record and selects the fields which contains personal identification information for further processing.

In some embodiments, the processor implements a language-specific analyzer to tokenize all text within selected data fields and generates a terms list for each single document.

The terms list is then used to build an in-memory inverted index which provides a mapping from terms to documents.

In some embodiments, the processor pre-processes user's input in natural language, recognizes the entity type for each term in the search query, and converts the search query to database query for the search engine.

In some embodiments, the processor computes the relevance score in real-time by matching the search terms and inverted index, and ranks the documents by a modified TF-IDF score.

In some embodiments, the processor decides all candidate entities base on relevance score ranking and returns data containing all information for further demonstration.

In some embodiments, the processor generates the visual element corresponding to at least the portion of the path by computing a knowledge graph of nodes and edges, the edges defining types of connections between the nodes for use by the ranking code to generate the path.

Embodiments described herein provide a process for populating an interface with real-time profile results and improved visualizations. The process involves: storing data records and a matching model in memory; classifying entity types using a processor executing instructions to determine whether a set of data sources refers to the entity using, and using a search engine to retrieve entities and a knowledge graph of nodes and edges representing connections between entities; aggregating multiple sources of data into the data record using the processor accessing the memory to process a real-time search query to generate a knowledge graph of nodes and edges representing connections between entities; storing the knowledge graph in the memory; rendering visualizations on an interface to display a real-time profile with visual elements extracted from the data record using the processor executing instructions to determine whether a set of data sources refer to an entity and aggregate the set of data sources to populate the data record using the matching model; executing a computer application for path traversal in the knowledge graph to discover a path to connect to the entity using ranking code; and updating the interface with a visual element corresponding to at least a portion of the path.

In some embodiments, the process further involves: receiving a name query from the interface at the processor to compute the entity and the set of data sources using the name query and the matching model.

In some embodiments, the process further involves: locating a first data set result and a second data set result from the set of data sources using the name query; updating with prompts at the interface for a supplemental query, and generating the data record using the supplemental query and the matching model.

In some embodiments, the process further involves: using real-time data aggregation logic to consolidate results generated by the matching model to populate the real-time profile with the consolidated results.

In some embodiments, the process further involves: locating a first data set result and a second data set result from the set of data sources and populates the data record using data extraction from the first data set result and the second data set result, field mapping of a field from the first data set result and another field from the second data set result, and entity matching by merging values from the first data set result and the second data set result.

In some embodiments, the process further involves: determining whether the set of data sources refer to the entity and aggregating the set of data sources to populate the data record by extracting a first data record from a first data source and a second data record from a second data source, mapping the first data record and the second data record using the matching model, and merging a portion of the first data record and a portion of the second data record to populate the data record.

In some embodiments, the process further involves: generating the visual element corresponding to at least the portion of the path by computing a knowledge graph of nodes and edges, the edges defining types of connections between the nodes for use by the ranking code to generate the path.

In some embodiments, the process further involves: processing user's input in natural language, recognizing the entity type for each term in the search query, and converting the search query to database query for the search engine.

In accordance with an aspect, there is provided a system for retrieving data from multiple data sources, and consolidating the data into a single data record. In accordance with another aspect, there is provided a system for determining whether data from two or more different data sources refer to the same entity.

In accordance with another aspect, there is provided a system for storing and searching both individual and organization entities from consolidated data in real-time.

In accordance with another aspect, there is provided a system for an interface illustrating direct and indirect connections between entities in a knowledge graph and for path traversal in the knowledge graph to discover and rank paths connected to a given entity.

Many further features and combinations thereof concerning embodiments described herein will appear to those skilled in the art following a reading of the instant disclosure.

DESCRIPTION OF THE FIGURES

In the figures:

FIG. 5A shows example results for a ranking of paths in a knowledge graph.

FIG. 5B shows example results for a ranking of paths in a knowledge graph.

DETAILED DESCRIPTION

Embodiments generally relate to profile search interfaces and web services with the ability to real-time search for and view details on entities and visualizations of a network connecting entities. A computer service performs a sequence of data aggregation heuristics to present a consolidated view of an entity and enables real-time profile search of entities.

Embodiments generally relate to a system for real-time profile search for web services. The system has a memory storing data records and a matching model to aggregate multiple sources of data into consolidated data records, a search engine to retrieve entities, and a knowledge graph of nodes and edges representing connections between entities. The system has a processor coupled to the memory with instructions for an interface to display a real-time profile with visual elements extracted from the data records. The processor executes instructions to determine whether a set of data sources refers to an entity and aggregates the set of data sources to populate the consolidated data records using the matching model. The processor receives user's search queries in natural language and converts to database queries to retrieve the corresponding individual and organization entities. The processor executes computer applications for path traversal in the knowledge graph to discover a path to connect to the entity using a ranking process, and updates the interface with a visual element corresponding to at least a portion of the path.

In some embodiments, the interface receives a name query, and the processor computes the entity and the set of data sources using the name query and the matching model.

In some embodiments, the interface receives a search query consist of multiple types of entities, and the processor recognizes the entity type for each term in the search query.

In some embodiments, the processor determines whether the set of data sources refer to the entity and aggregates the set of data sources to populate the data record by extracting data records from different data sources, mapping the data records using the matching models, and merging the data records to populate the consolidated data records.

In some embodiments, the processor pre-processes the consolidated data records by tokenizing all text fields related to personal identification information, building an inverted-dictionary between each token and related document, distributing the consolidated data on multiple computational instances, and allowing real-time document retrievals with low latency.

Figure 1:
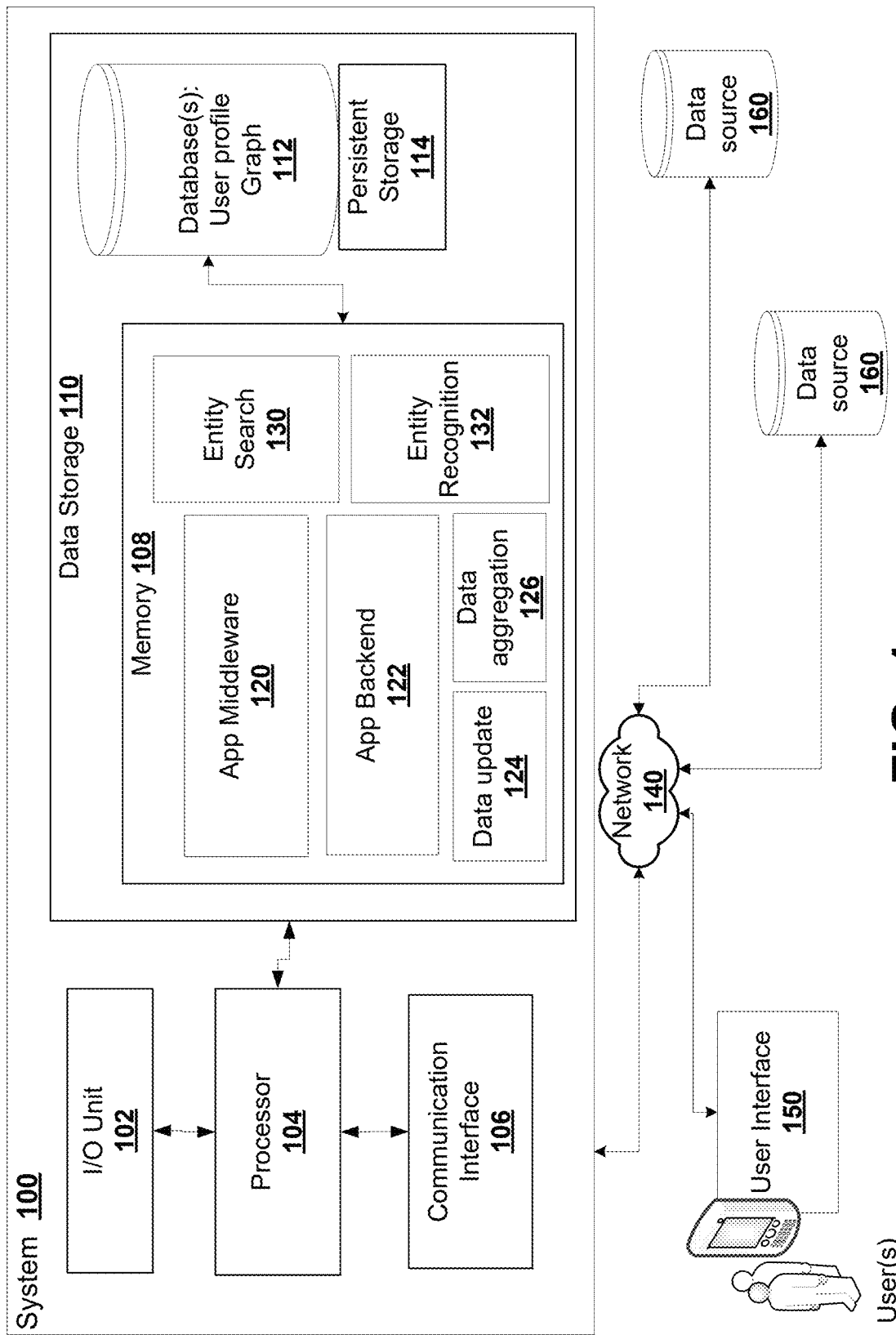
FIG. 1 shows an example system for real-time search for web services.

FIG. 1 shows an example system 100 for real-time profile search for web services. The system 100 has data storage 110 with a memory 108 storing data sets and a processor 104 that accesses the memory 108 to execute code, process queries and return data to populate an interface 150 with improved visualizations of entities and connections to entities. The illustration shows example aspects of system 100. Other components of system 100 are described in relation to other figures. The system 100 has an input output (I/O) unit 102 that receives input data and provides output data with other components. The system 100 has a communication interface 106 to exchange data with other components. The system 100 can provide a web application having an interface 150 on a computer device. The communication interface 106 for the web application can exchange data between the app middleware 120 and the interface 150. The app middleware interacts with the app backend 122 to exchange data and process queries to populate the interface 150.

The system 100 provides real-time profile search for web services. The system 100 has data storage 110 with a memory 108 storing a data record, a data aggregation 126 service having a matching model to aggregate multiple sources of data into the data record, an entity recognition 132 service to recognize entities and classify entity types, and a search engine 130 to retrieve entities. The memory 108 has databases 112 of user profiles and a knowledge graph of nodes and edges representing connections between entities.

The system 100 processes search queries for entities using entity recognition 132 and entity search 130, and returns a profile of an entity of data aggregated by system 100 from multiple data sources 160. The system has a entity recognition 132 process a search query to identify entities and entity types to generate an optimized search query (e.g. of the entity and entity type) for the entity search 130. The entity search 130 retrieves one or more profiles for the entity from the database 112 and data sources 160. The data aggregation logic 126 determines whether the data from the data sources 160 relate to the same entity. The data aggregation logic 126 combines data from the data sources 160 into a single aggregated profile stored in database 112. The system 100 displays the profile via a user interface 150.

The system 100 provides real-time data retrieval for web services. The system 100 has a processor 104 coupled to the memory 108 with instructions for populating an interface 150 to display a real-time profile for an entity with visual elements extracted from the data record. The processor 104 executes instructions to identify a set of data sources for the entity using the entity recognition 132 service and the entity search 130 engine. The entity recognition 132 service can convert raw input data of a search query into an optimized search query of an entity name and entity type. The entity recognition 132 service recognizes entity names and entity types in raw input data to generate an optimized search query. The entity search 130 engine uses the optimized search query to identify profiles for the entity in the database 112.

The database 112 is populated with user profiles and knowledge graphs of data from different data sources 160. The processor 104 executes instructions to aggregate the set of data sources to populate user profiles (of database 112) using the data aggregation 126 service having the matching model to combine multiple profiles for the same entity. The processor 104 pre-processes the consolidated data and prepares the data for the search engine 130. The processor 104 executes a computer application for path traversal in the knowledge graph (of database 112) to discover a path to connect to the entity using ranking code, and updates the interface 150 with a visual element corresponding to at least a portion of the path.

The system 100 provides real-time information retrieval using the entity search 130 engine and entity recognition 132 service. The entity recognition 132 service generates a search query for the entity search 130 engine by processing raw input data to recognize entity names and entity types. The entity search 130 engine retrieves profiles and related data using the search query. In some embodiments, the interface 150 receives a name query, and the processor 104 computes the entity and the set of data sources using the name query and the matching model.

In some embodiments, the processor 104 locates a first data set result and a second data set result from the set of data sources using the name query. The processor 104 prompts the interface 150 for a supplemental query, and generates the data record using the supplemental query and the data aggregation 126 service having the matching model. In some embodiments, the processor 104 uses data aggregation logic to consolidate results generated by the matching model to populate the profile with the consolidate results.

In some embodiments, the processor 104 locates a first data set result and a second data set result from the set of data sources and populates the data record using data extraction from the first data set result and the second data set result. The data aggregation 126 service consolidates the data set results using field mapping of a field from the first data set result and another field from the second data set result, and entity matching by merging values from the first data set result and the second data set result.

The entity recognition 132 service processes raw input data to identify entities and classifies entity types. For example, the entity recognition 132 service considers: what is a user name? what is a company? In some embodiments, the entity recognition 132 service analyzes user's input in natural language, recognizes the entity type for each term in the search query, and converts the search query to a database query for the entity search engine 130. For example, before searching, the advisor can provide raw input data and identify the name and entity type for entity search. The entity recognition 132 service uses deep learning model to learn names and entity types from training data and sample data. The entity recognition 132 service can build and use a language model, such as a transformer model.

The data aggregation 126 service can aggregate multiple data records into a single profile or data record for an entity. In some embodiments, the processor 104 determines whether the set of data sources refer to the same entity. The data aggregation 126 service aggregates the set of data sources to populate the data record by extracting a first data record from a first data source and a second data record from a second data source, mapping the first data record and the second data record using the matching model, and merging a portion of the first data record and a portion of the second data record to populate the data record.

In some embodiments, the processor 104 reads the consolidated data record and selects the fields which contains personal identification information for further processing. The processor 104 can match a data record to other records with similar personal identification information. The processor 104 can extract the personal identification information to present at the interface 150. The processor 104 can identify attributes to create the profile. The processor 104 can implement further processing of attributes to display on the screen (attributes) or interface 150 of device.

The interface 150 displays an interactive network with nodes corresponding to entities and links corresponding to connections to other entities, interests, organizations, and so on. The nodes are selectable to update the interactive network of the interface 150. The interactive network can highlight paths between nodes. In some embodiments, the processor 104 generates the visual element corresponding to at least the portion of the path by computing a knowledge graph of nodes and edges. The edges define types of connections between the nodes for use by the ranking code to generate the path.

The entity search 130 can receive queries and, in response, return entities and related data. The result data can be used to populate the interactive network of the interface 150. For example, the entity search 130 can identify profiles of entities that are high net worth individuals and prospecting opportunities, and return related data for populating user interface 150. The interactive network of interface 150 can have nodes corresponding to prospects and links to other nodes corresponding to organizations, individuals, and interests, for example. The search capability of the entity search 130 can include queries and string matches focused on the entity name (first and last name) and can also extend to more robust criteria about the entity. The entity search 130 can ease data entry for search queries, and the user is not required to set out as first name, last name, for example. The entity search 130 can return profiles that aligns with user input from queries. The entity search 130 can return valuable and actionable information for the user interface 150, or for another client. The entity search 130 can identify matches beyond a person to person connection, and can identify connections based on organization, industry members, and locations for example. The entity search 130 can interact with entity recognition 132 to identify and recognize entities received as input data, for example.

In some embodiments, the processor 104 implements a language-specific analyzer to tokenize all text within selected data fields and generates a terms list for each single document.

The terms list is then used to build an in-memory 108 inverted index which provides a mapping from terms to documents. The processor 104 builds or updates the entity search 130 engine. The processor 104 uses the mapping to identify relevant documents.

In some embodiments, the processor 104 computes the relevance score in real-time by matching the search terms and inverted index, and ranks the documents by a modified TF-IDF score.

In some embodiments, the processor 104 decides all candidate entities based on relevance score ranking and returns data containing all information for further demonstration. The processor 104 uses the ranking for the entity search 130.

The system 100 can have an SSO authentication layer to secure the web application. The app middleware 120 can relay information, and the app backend 122 collects data from different components, databases 112, and data sources 160. The data aggregation 126 service can aggregate data from different data sources 160 for storage in databases 112 in memory 108 and persistent storage 114 of the data storage 110. The data aggregation 160 can occur before the entity search 130 receives and processes a search query, and data aggregation 160 can store data in the databases 112 for app backend 122 to access in order to respond to search queries. The entity search 130 can use the data stored to respond to search queries.

The system 100 can provide a single web search experience to support the need to efficiently identify entities, and retrieve and consolidate data from multiple sources. The system 100 can remove initial user input limitations and does not require an entity name to be provided as structured data in some embodiments. The system 100 can improve performance, while also expanding the scope of data sets accessed. The system 100 can provide a more expansive view of relational data surrounding entities. The system 100 can use an entity recognition 132 service that is capable of identifying individual attributes (versus company attributes) found in the search input. The system 100 can increase the accuracy in results returned based on a new string matching model of the entity recognition 132 service, returning closest matches to the search input. The system 100 can open additional opportunities to refine search results useful to the end-user, and to understand user search behaviours.

The data aggregation 126 service seeks to aggregate information from multiple data sources 160. The entity recognition 132 service uses a matching model to identify and recognize an entity where data is available. The data aggregation 126 service uses a matching model to decides how to aggregate multiple sources 160 of data into a single record or entity profile. The data aggregation 126 service uses a model to determine whether multiple data sources refer to the same person or entity. The processor 104 executes a computer application (e.g. stored in memory 108) for path traversal in a knowledge graph (of database 112) to discover how to connect with an entity and some priority for connecting with the entity.

Data aggregation can come with computability challenges. The time complexity of the matching algorithm can grow exponentially with respect to the number of entities. In some embodiments, the system 100 can account for this by setting an upper bound to the amount of entities that are returned from each data source. This allows the system 100 to keep both the time and space complexity of the aggregation process predictable, and feasible to be run via the runtime memory of the service performing the data aggregation. The trade-off taken on with this approach is the possibility of missing certain entities that could be a potential match.

The system 100 uses entity search 130 to conduct a search for an entity based on user input received via user interface 150. For example, a user may search for individuals by name, such as first name and last name. The entity search 130 can receive different values or attributes for defining search parameters. For example, there can be a combination of attributes, such as title, first name, last name, middle name, position, location, organization type, and so on. The entity search 130 can also filter search results to reduce what is provided or displayed on the interface. The system 100 conducts a real-time search of databases 112 of data aggregated (e.g., by data aggregation 126) across multiple data sources for the entity. The system 100 can aggregate data across more than one dossier or data source 160, and store the aggregated data as a consolidated profile in database 112. The system 100 can prompt for additional search parameters for the search query to further reduce potential matches.

In some embodiments, the real-time search and information retrieval is conducted by making synchronous real-time API calls against the entity search 130 engine which interacts with databases containing all searchable information. The results of these API calls may be held in memory-leveraging JavaScript on the client's web browser.

In some embodiments, the system 100 may request additional user input to refine the search. For example, if a search for an individual using a search query consisting of an individual's first name and last name returns multiple results, the user may refine the search by providing additional values for search parameters, such as the name of the individual's employer or organization. The entity recognition 132 service can recognize different types of entities such as an individual's name and organization from the user's input in natural language. The entity recognition 132 and entity search 130 engine converts the query in natural language to a search engine query and a new real-time search/retrieval can be performed across the data sets in order to identify the results. The updated search can be conducted on the set of returned results. The updated search may be conducted on all system data or a subset of the data.

The system 100 conducts the updated search to identify data sets. If the updated search returns multiple data sets, then the system 100 can implement profile matching code to further refine the search results. The system 100 uses data aggregation 126 logic to consolidate the refined results. For example, the system 100 can implement profile matching code to determine that the multiple search results relate to the same entity. The system 100 uses data aggregation logic 104 to consolidate the search results into a consolidated profile for the entity. The system 100 transmits the data to the interface 150 to render visualizations for a detailed profile view.

In some embodiments, the real-time data retrieval returns data aggregated from different data sources 160, and the system 100 may display the multiple results to the user in order for the user to review the results and select a subset of data from the result. In some embodiments this may occur when the searches have returned multiple profiles. For example, a search query for an individual can include the individual's first name and last name and can return multiple results from a data source, and a subsequent search for the individual using a query consisting of the individual's first name, the individual's last name, and the name of the individual's assumed company returns multiple results from a data source, then the multiple results may be displayed to user in the form of digital profile cards and the user interface 150 may prompt to select a result based on the digital profile cards.

In some embodiments, the system 100 may collect user input for conducting the search through a search bar of user interface 150. For example, the system 100 may request that the user enter a first name and last name of an individual being searched for. The system 100 may also request further information at an interface 150 if additional searches are required or if the user must select a result from multiple results from one or more data sources.

After returning search results, the system 100 invokes a profile matching code 102. The profile matching code 102 can be used to determine whether the search results from each of the data sources refers to the same entity.

Figure 2:
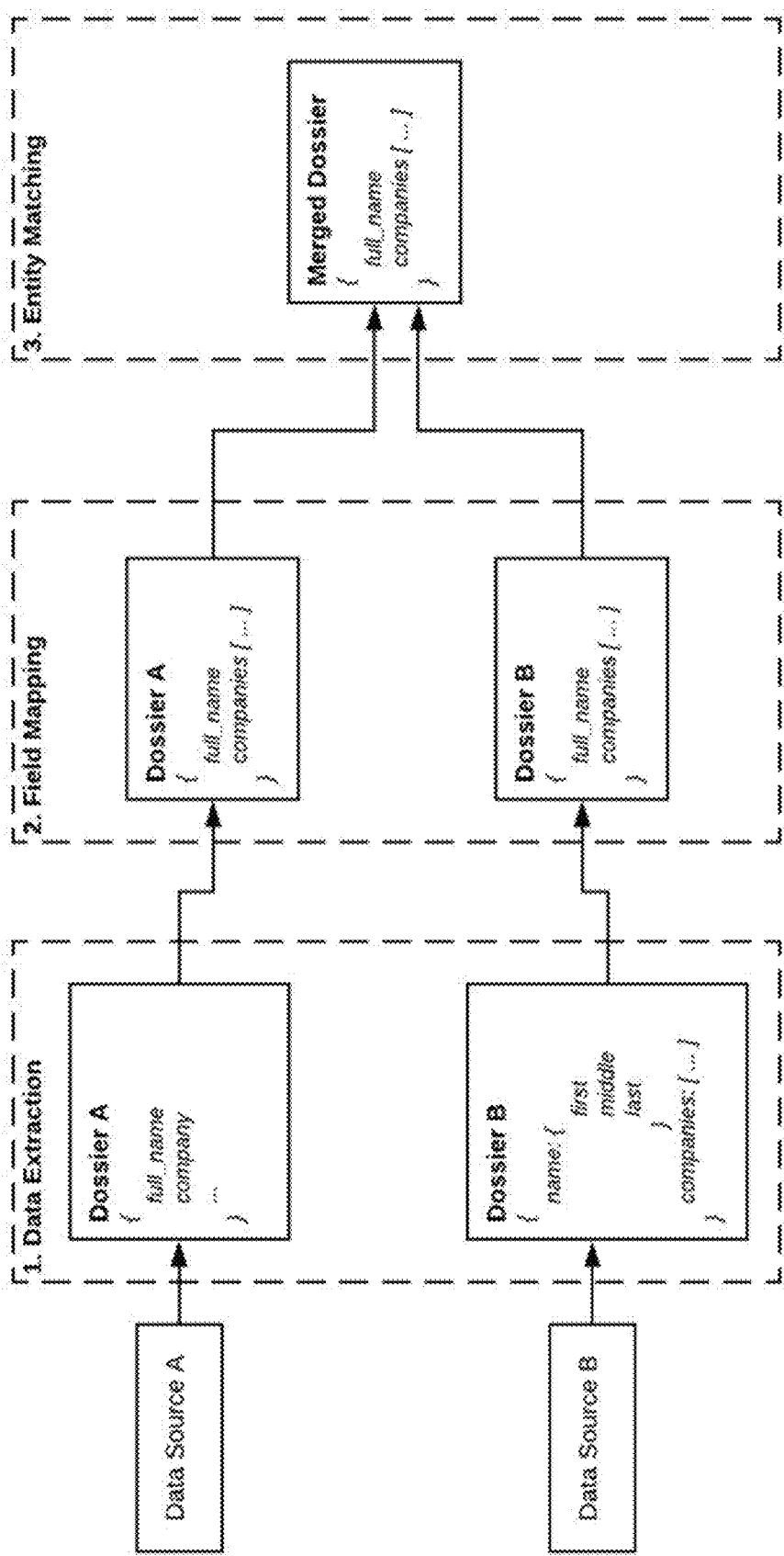
FIG. 2 show an example process for matching data from two sources.

FIG. 2 shows a process of matching data from two sources using the data aggregation 126 and the profile matching code. The system 100 has a processor 104 that locates a first data set result and a second data set result from the set of data sources and populates the data record for storage in databases 112. The processor 104 uses data aggregation 126 for data extraction from the first data set result and the second data set result, field mapping of a field from the first data set result and another field from the second data set result, and entity matching by merging values from the first data set result and the second data set result.

The data aggregation 126 can execute profile matching code to extract data from two data sources, maps fields from the extracted data to fields in a defined shared schema, and uses a heuristic to determine whether the extracted data refer to the same entity. This example shows two data sources but more than two data sources can be used for other embodiments.

The data aggregation 126 can execute profile matching code to extract data from two data sources 160 by querying the data sources for a particular entry. In some embodiments the query may be a real-time search. In some embodiments the query may be part of an asynchronous search for a set of records, for example, as part of a batch script.

For each data source that the system 100 queries, the data aggregation 126 can execute the profile matching code 102 with a unique mapping from fields in the data source to fields in a defined shared schema. For example, one data source may store an individual's name as a single field containing the full name while a second data source may store an individual's name in three separate fields for first, middle, and last names. In some embodiments, the shared schema may contain a single filed containing the full name with the data in the first data set being directly mapped to the field in the shared schema and the data in the second data set having a concatenation of the three fields mapped to the single field in the shared schema.

The profile matching code can use a heuristic to determine whether search results from different data sources refer to the same entity. The profile matching code 102 uses string matching between fields in the shared schema to determine whether the data from the two sources refer to the same entity.

The string matching may check for an exact match between fields or for a fuzzy match between fields. The heuristic determines which fields should be compared using an exact string and which fields should be compared using a fuzzy match. For example, in some embodiments, an individual's email address may be compared using an exact match while the individual's name may be compared using a fuzzy match to account for differences between data sources, for example, data sources that do not contain information about an individual's middle names.

The data aggregation 126 can execute the profile matching code to check fields that are deemed to be unique, for example, an individual's email address. If there are matches between unique fields then the profile matching code determines that the data in both data sources refer to the same entity. If there are no matches between unique fields then the data aggregation 126 can execute the profile matching code to check for matches in combinations of fields that together are deemed to be unique. In some embodiments, for example, the combination of an individual's name and date of birth may be deemed to be unique and where there is a match between two data sources for these fields the data in the two sources may be deemed to refer to the same entity.

In some embodiments, the profile matching code may use shared connections in a knowledge graph to determine if data in two data sets refer to the same individual.

The system 100 has data aggregation 126 that aggregates information from search results from multiple data sources into a single result data object. The data aggregation 126 uses the data from the multiple data sources to construct a single result data object. The result data object is constructed by determining which data source is best able to contribute to a required field in the result data object. In the case where only one data source has information that can contribute to a required field, the data from the source is extracted and stored in the result data object. In the case where multiple data sources has information that can contribute to the result data object, a sequence of validations are executed to determine which data source contains the more appropriate fields to be to be extracted and store in the result data object. For example, data aggregation 126 may choose data from one data source over data from another because the data are more detailed, the data are more recent, or the source of the data is more authoritative.

In some embodiments, the data aggregation 126 may operate in stages depending on user needs and the level of information required by the user interface 160. For example, when a user runs a search, the user interface 160 may only display preview profile of the result that only displays basic information about an entity, such as a name a date of birth, with an in-depth profile of all the data pertaining to the entity only being displayed if the user chooses to access the it.

The data aggregation 126 may initially only be performed on the data from the multiple data sources pertaining to the basic information contained in the preview profile. If the user then chooses to access the full in-depth profile, the data aggregation 126 may be performed on the remaining data in order to create the full in-depth profile. By only performing data aggregation as data is required, the system 100 can use computer memory efficiently and reduce the aggregation time of the preview profile.

In some embodiments, the system 100 may allow for multiple searches to be inputted in batches. In some embodiments, multiple searches may be performed automatically to generate a knowledge graph of entities.

Knowledge graphs store information about entities and how they are related to one another. The nodes of the knowledge graph correspond to entities. The edges of the knowledge graph correspond to relationships between these entities.

Figure 3:
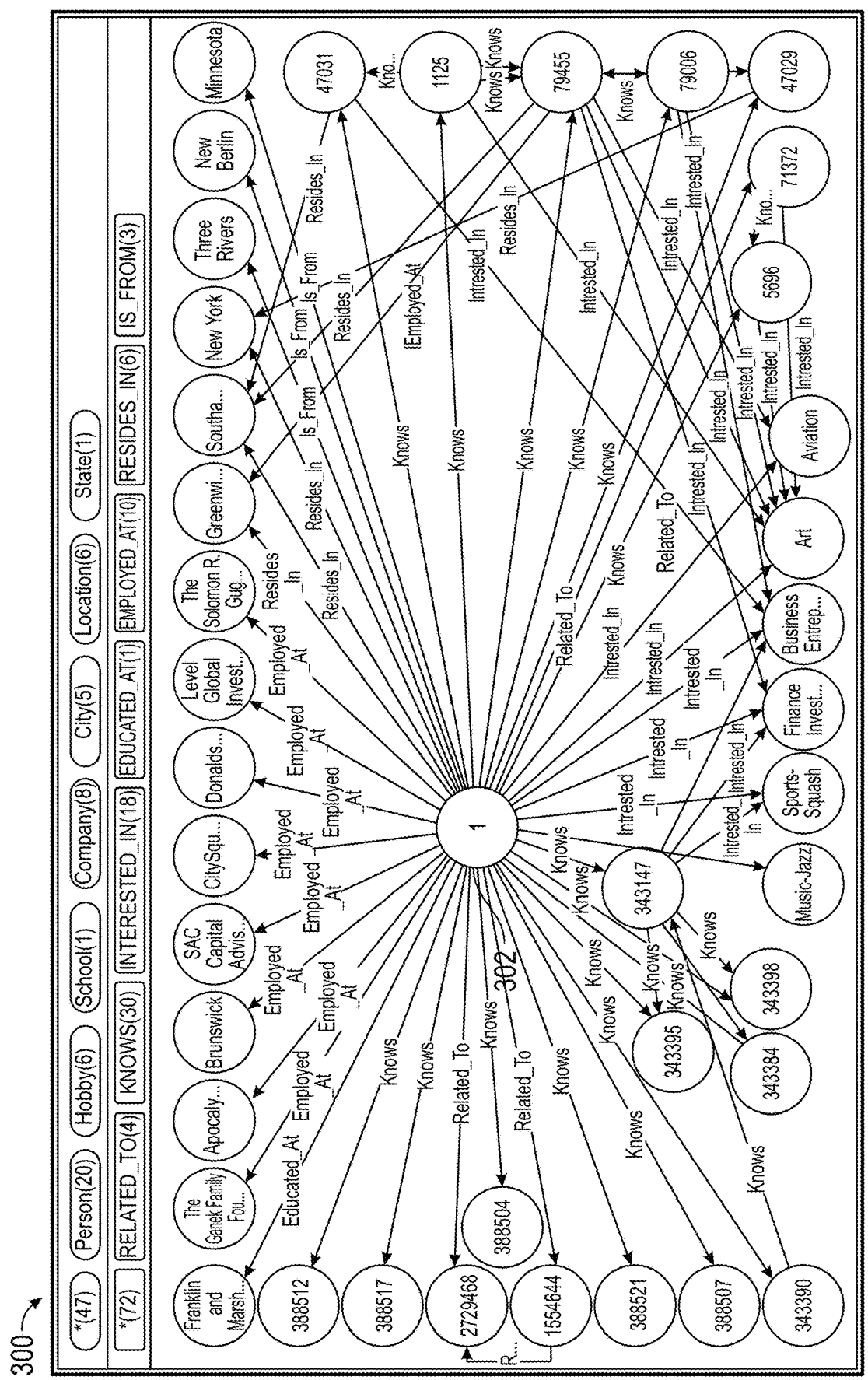
FIG. 3 show an example knowledge graph.

FIG. 3 shows an example knowledge graph 300. The knowledge graph 300 has nodes and edges. The nodes can relate to entities and the edges can define connections between the entities.

The knowledge graph 300 stores information on the network for an individual 302 as an example entity. The knowledge graph 300 illustrates how the individual 302 is directly related to other entities, for example, other individuals, companies, locations, educational institutions, hobbies, and interests. The edges of the knowledge graph illustrate how these entities are connected to each other. Different functions can be linked to the edges to define the connections. For example, functions such as 'educated at', 'knows', 'resides in', 'interested in', 'related to' can be linked to edges connected nodes of the graph 300. The entity recognition 132 service can use the knowledge graph 300 to identify entities. The entity search 130 can use the knowledge graph 300 to search for entities and connections between entities.

The system 100 can use path-finding code to determine how two entities are connected. These paths may be filtered based on various characteristics, for example, the maximum number of edges between the entities.

Figure 4:
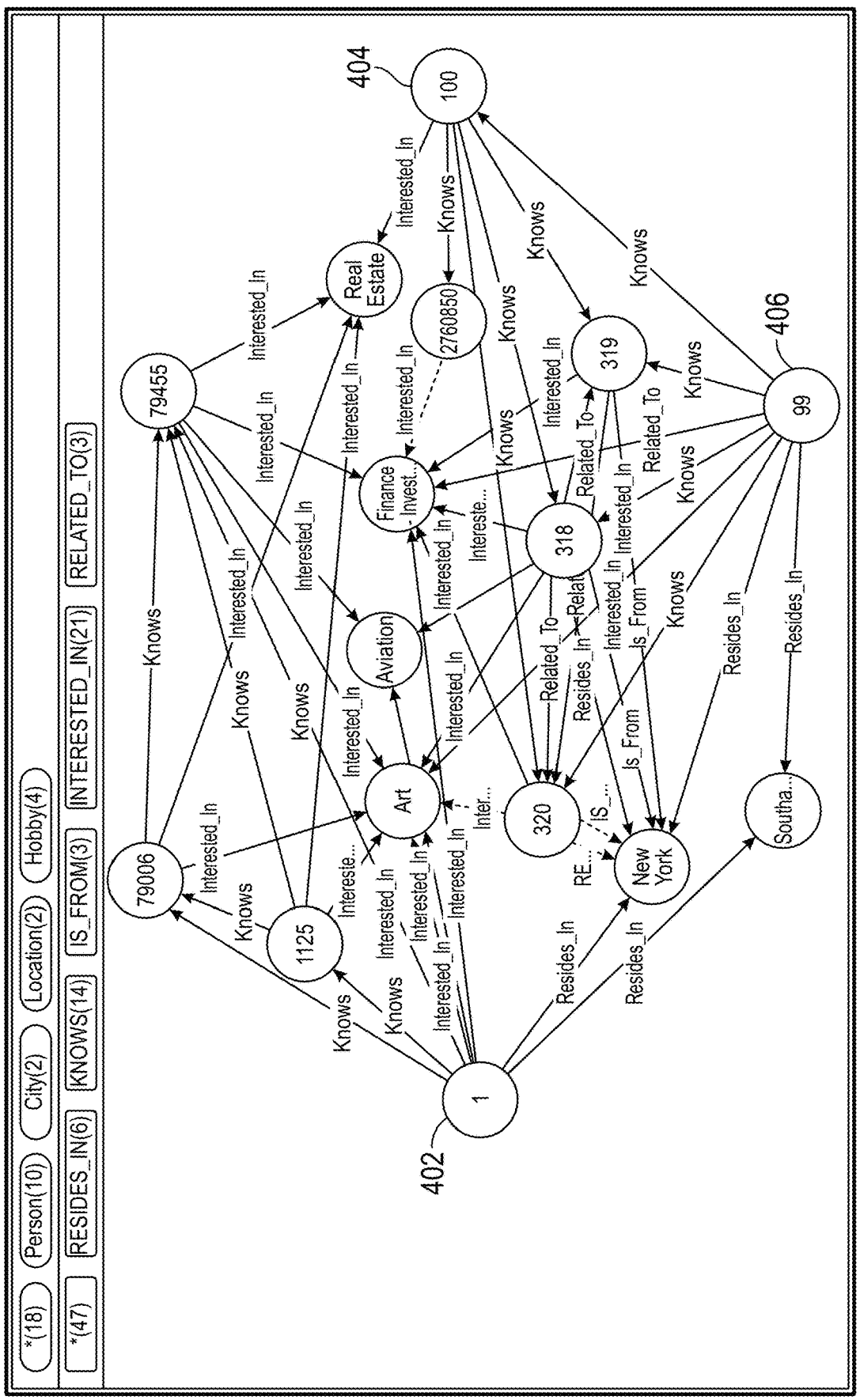
FIG. 4 shows example results of a path search of a knowledge graph.

FIG. 4 shows example results of path finding code. The results are data corresponding to a graph of nodes and edges defining connections between entities. The system 100 populates the interface with visualizations with the results of the path finding code.

The results in FIG. 4 show paths between a first individual 402 and a second individual 404. The results have been filtered so that only paths with a length of no more than 3 edges between the two individuals 402 and 404 are shown. The paths represent different ways in which the two individuals 402 and 404 are related to one another. For example, individual 402 resides in New York, as does individual 406, who in turn knows individual 404.

The system 100 computes rankings for paths of nodes and edges. The paths are made up of edges and each edge can be ranked by system 100 assigning a value, score or metric to the edge. The paths of edges can be ranked using the values or metrics of the edges connecting nodes in the path. This ranking may be according to characteristics of the entities or relationships along the path. Characteristics of the nodes that may be used for ranking paths are, for example, the number of other nodes that the node connects to or, where the node represents an individual, the wealth of the individual represented by the node. Characteristics of the edges that may be used for ranking paths are, for example, the type of relationship it represents. In some embodiments, the length of a path may also be used to determine the path's rank. The system 100 populates the interface with visualizations with the rankings of the paths to help visualize the strength of connections between nodes of the path.

Figure 5B:
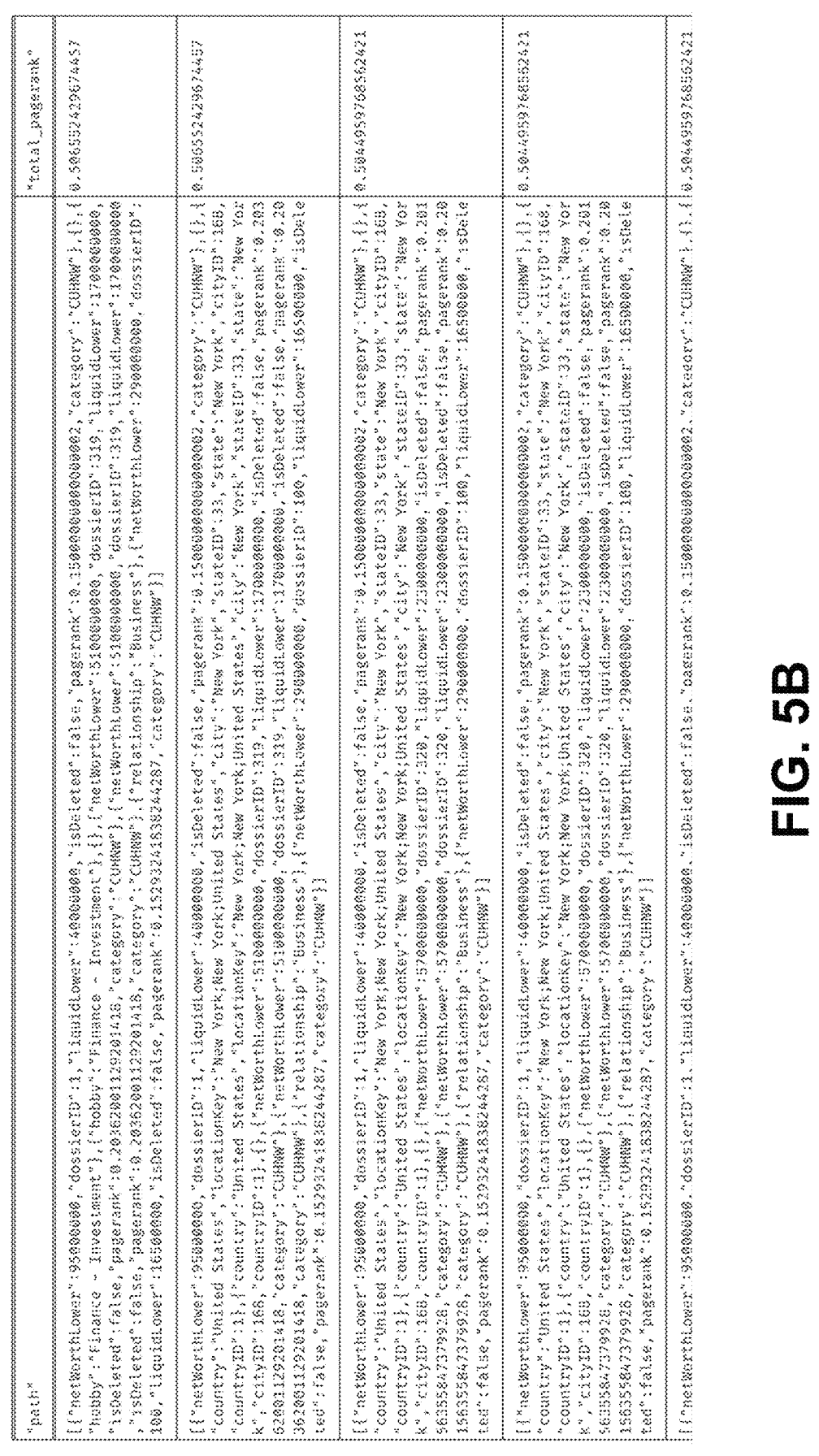

FIGS. 5A and 5B show examples results generated by system 100 ranking paths in a knowledge graph. The system 100 has an interface with visualizations of the results of the path finding code.

The results in FIGS. 5A and 5B are for rankings of the paths shown in FIG. 4. The results in FIGS. 5A and 5B are ranked according to different methodologies. The system 100 can be configured to use different methods to compute rank results. The results in FIG. 5A are ranked so as to prioritize the path through nodes representing individuals having the highest net worth. The results in FIG. 5B are ranked so as to prioritize the path through nodes with the most relationships with other nodes.

In some embodiments, the system may be used to allow sales professionals in the wealth industry to determine the best way to connect with a potential sales prospect by providing actionable data about the sales prospect and connections thereto. For example, a sales professional may use the system to search for a sales prospect, generate a knowledge graph of entities related to the individual by a maximum of three relationships, determine paths between the sales prospect and existing contacts or clients. The sales professional may then rank the paths based of the sales professional's objectives, for example, the sales professional may wish to prioritize paths where the relationships between individuals are through a shared educational institution.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide for better memory usage, improved processing performance, and improved user experience.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 6:
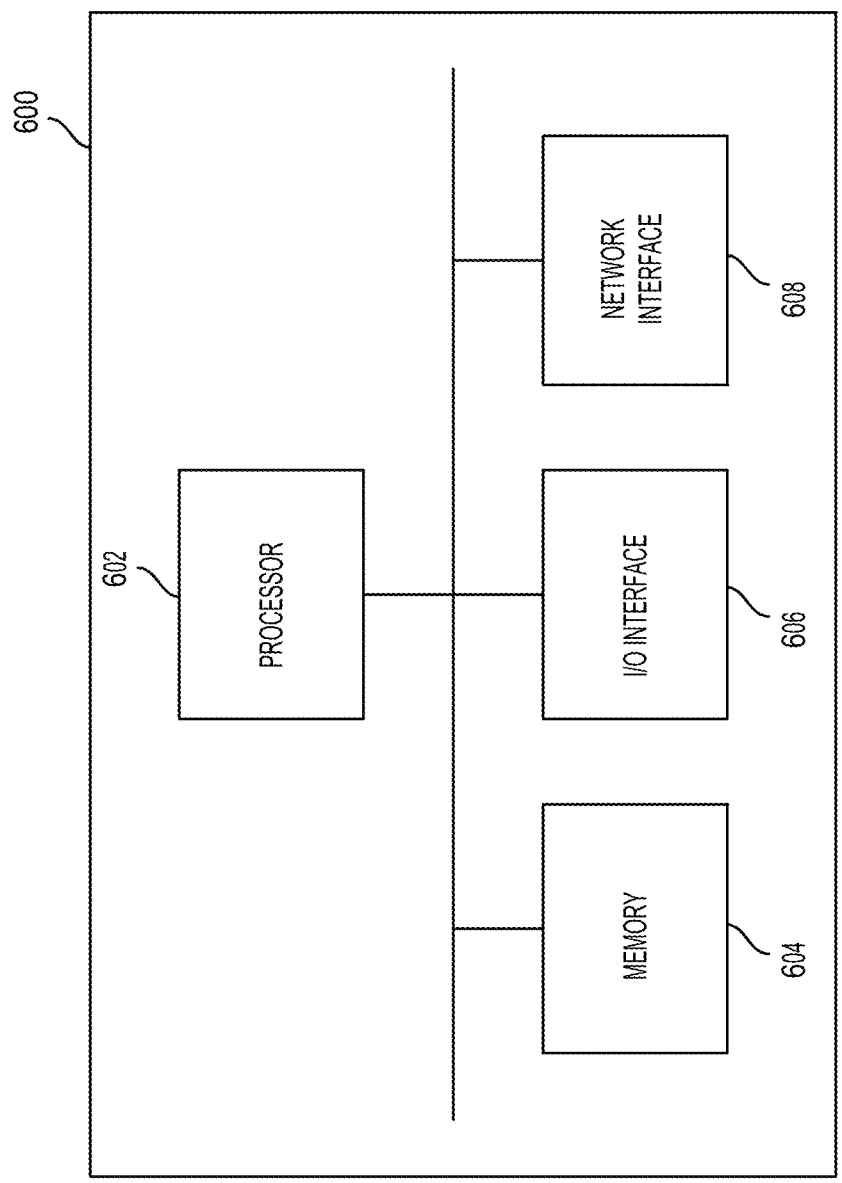
FIG. 6 shows and example computer device.

FIG. 6 is a schematic diagram of computing device 600 that can implement aspects of embodiments. As depicted, computing device 600 includes at least one processor 602, memory 604, at least one I/O interface 606, and at least one network interface 608. The computing device 600 can implement aspects of system 100, for example. The computing device 600 can have interface 150 to access web application as another example.

Each processor 602 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 604 may include a suitable combination of any type of computer memory that is located either internally or externally such as, for example, random-access memory (RAM), read-only memory (ROM), compact disc read-only memory (CD-ROM), electro-optical memory, magneto-optical memory, erasable programmable read-only memory (EPROM), and electrically-erasable programmable read-only memory (EEPROM), ferroelectric RAM (FRAM) or the like.

Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 600 is operable to register and authenticate users (using a login, unique identifier, and password for example) prior to providing access to applications, a local network, network resources, other networks and network security devices. Computing devices 600 may serve one user or multiple users.

Figure 7:
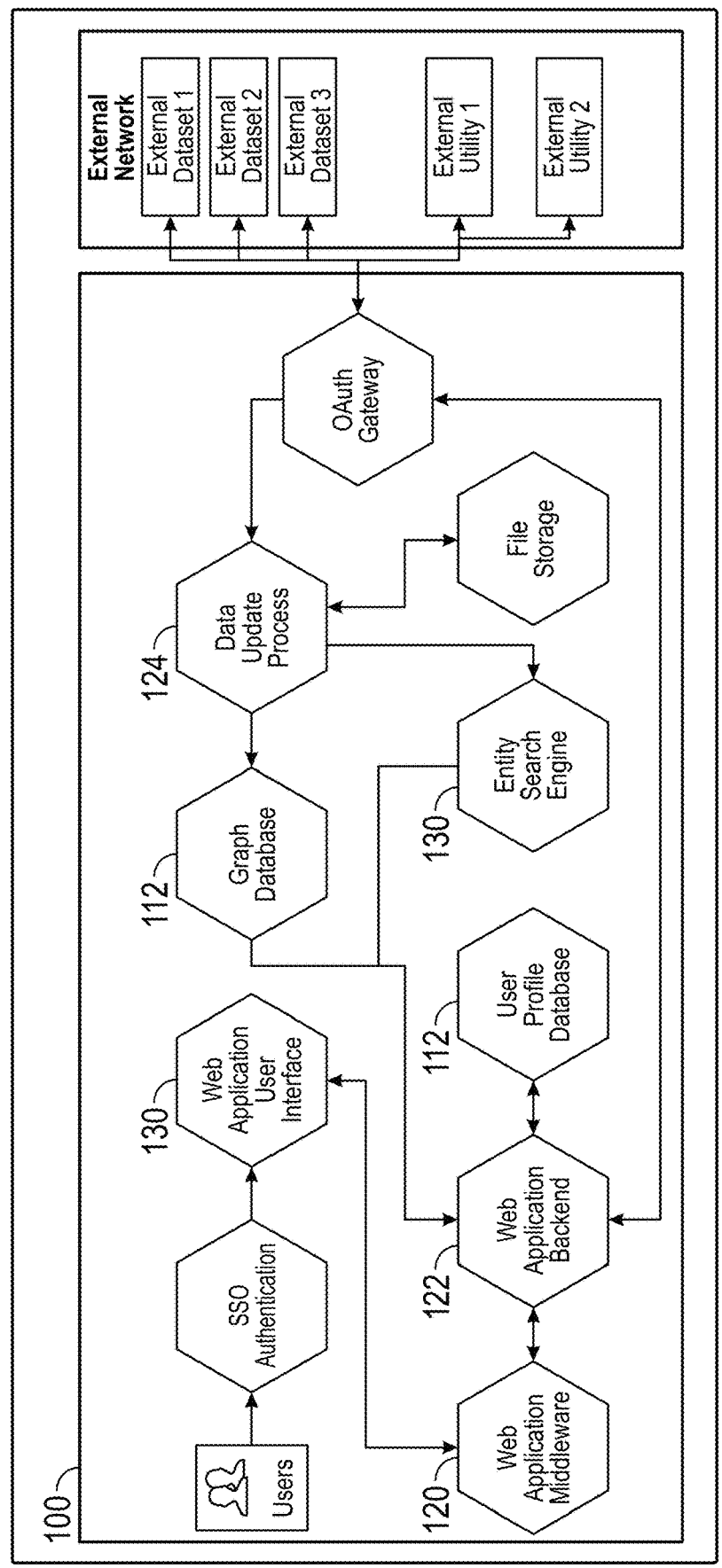
FIG. 7 shows an example solution diagram according to embodiments described herein.

FIG. 7 shows an example solution diagram of system 100 according to embodiments described herein. The example solution shows an internal network connecting components of system 100 and an external network of external datasets and external utilities to exchange data with the system 100.

The internal network can connect to a user device and authenticate a user using SSO authentication. The system 100 can provide a web application with an interface 130, app middleware 120, and app backend 122. The app middleware 120 can relay commands, requests and data between the app backend 122 and other components. The app backend 122 can connect to databases 112 such as a graph database (storing knowledge graphs) and a user profile database. The app backend 122 connects with entity search 130 to exchange data to populate the interface 130. The data update 124 receives data from external network (e.g. external datasets) via authentication gateway for storage in file storage and graph database. The entity search 130 accesses the data from data update 124. This is an example solution according to embodiments described herein. The system 100 keeps updating the database over time as new data is available and at different time periods.

Figure 8:
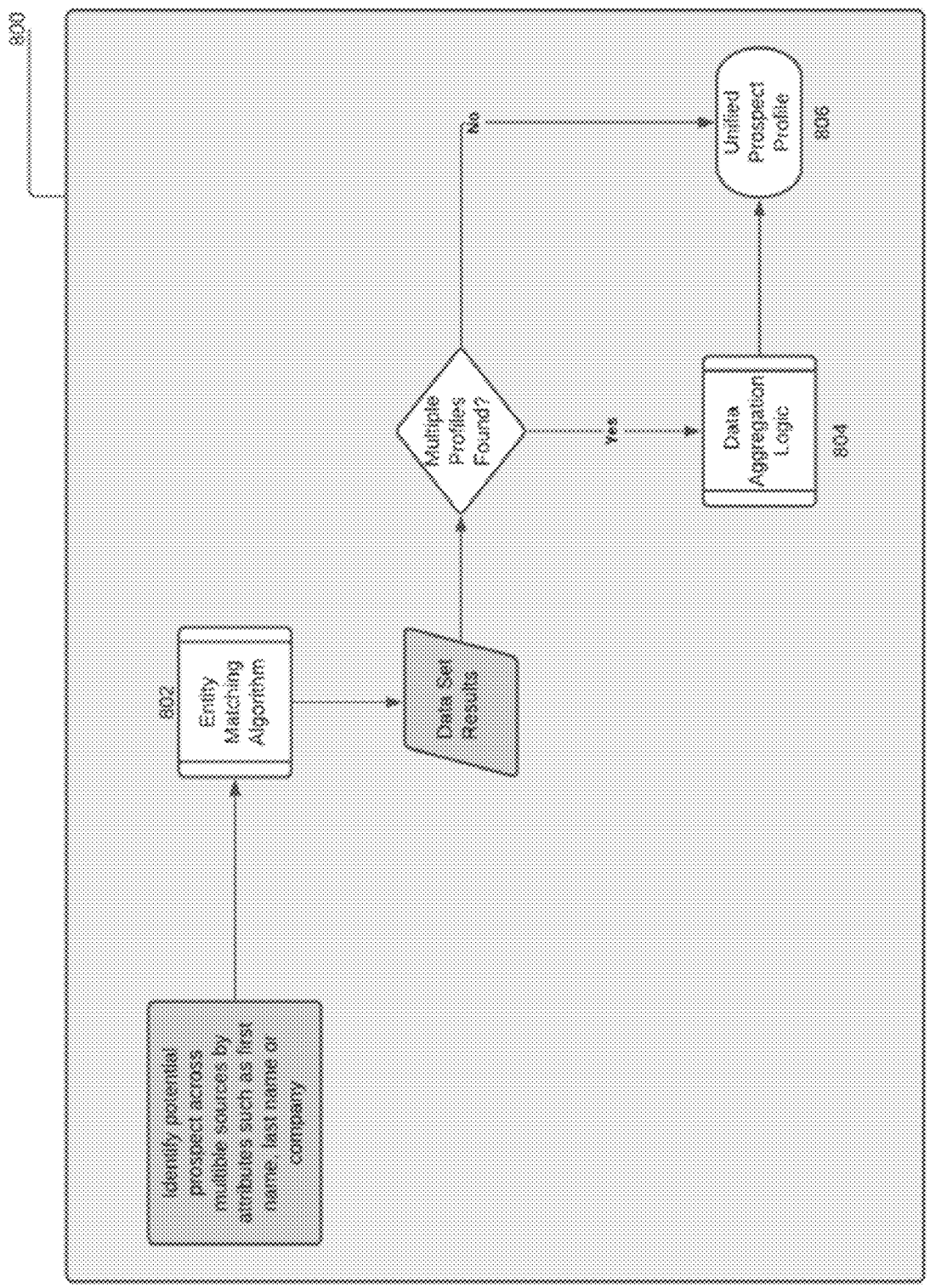
FIG. 8 shows an example flow diagram of a process according to embodiments described herein.

FIG. 8 shows an example flow diagram of a process 800 according to embodiments described herein.

At 802, entity search 130 executes entity matching code to identify entities (e.g. potential prospects) across multiple data sources by attributes. In some embodiments, the attributes can be received as a search request. Example attributes include first name, last name, company, and so on. The entity search 130 executes entity matching code to generate data search results. If there are multiple profiles in the data search results, then at 804, the data aggregation 126 aggregates the multiple profiles to generate a unified prospect profile at 806. If there are not multiple profiles in the data search results, then the process proceeds to the unified prospect profile at 806. The data aggregation 126 implements a matching process to identify attributes that are shared by multiple profiles. The data aggregation 126 can use an unsupervised machine learning process to build the map between different keys of data records. The data aggregation 126 can generate a similarity score between multiple profiles to see if they should be merged.

Figure 9:
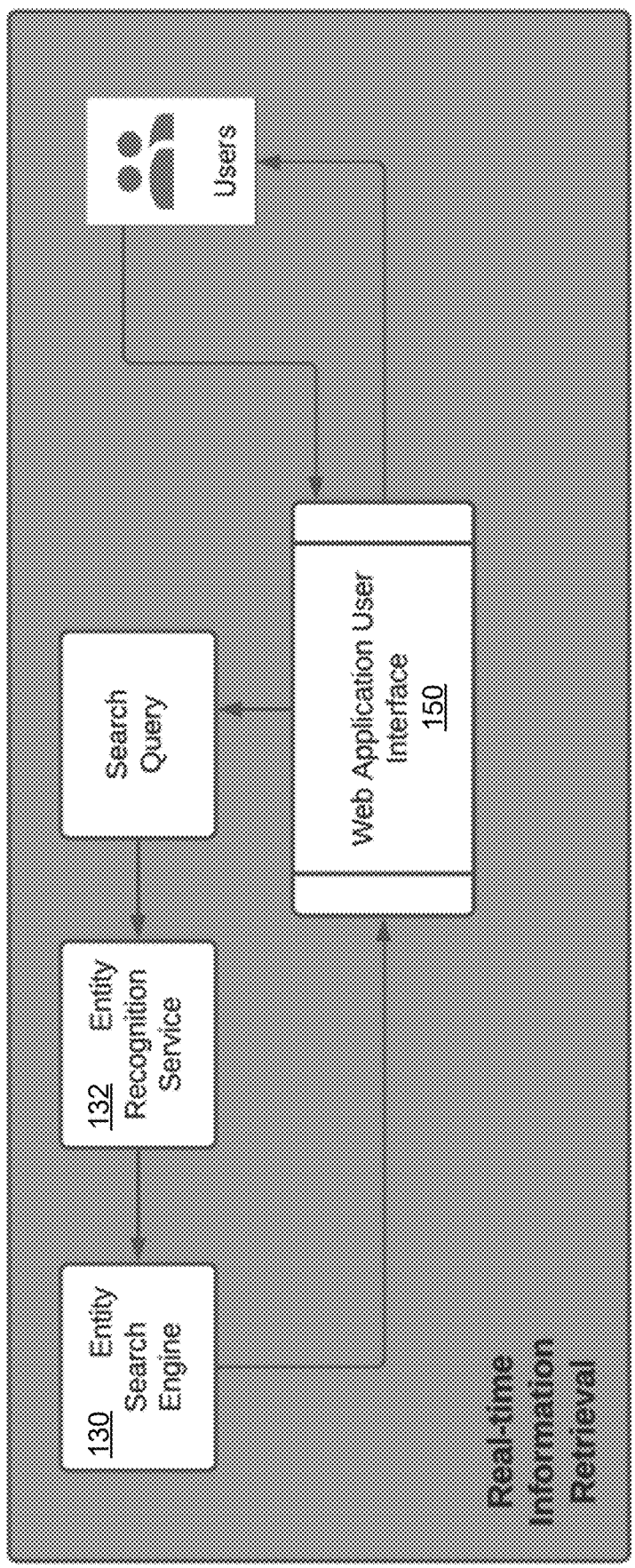
FIG. 9 shows an example diagram according to embodiments described herein.

FIG. 9 shows an example solution diagram for real-time information retrieval according to embodiments described herein. The user interface 150 receives a search request for entity related data. The user interface 150 provides a search query (with attributes) to the entity recognition 132 service to identify one or more entity from the attributes of the search query. The entity recognition 132 provides entity data to the entity search 130 engine to compute data results. The entity search 130 engine returns the data results to populate the user interface 150. The entity search 130 can filter the results and prompt for more search parameters as needed to reduce the search results. The entity recognition 132 can assign labels to search input for the entity search 130. The entity recognition 132 identifies entities and labels raw input data (name, organization) for the entity search 130.

Figure 10:
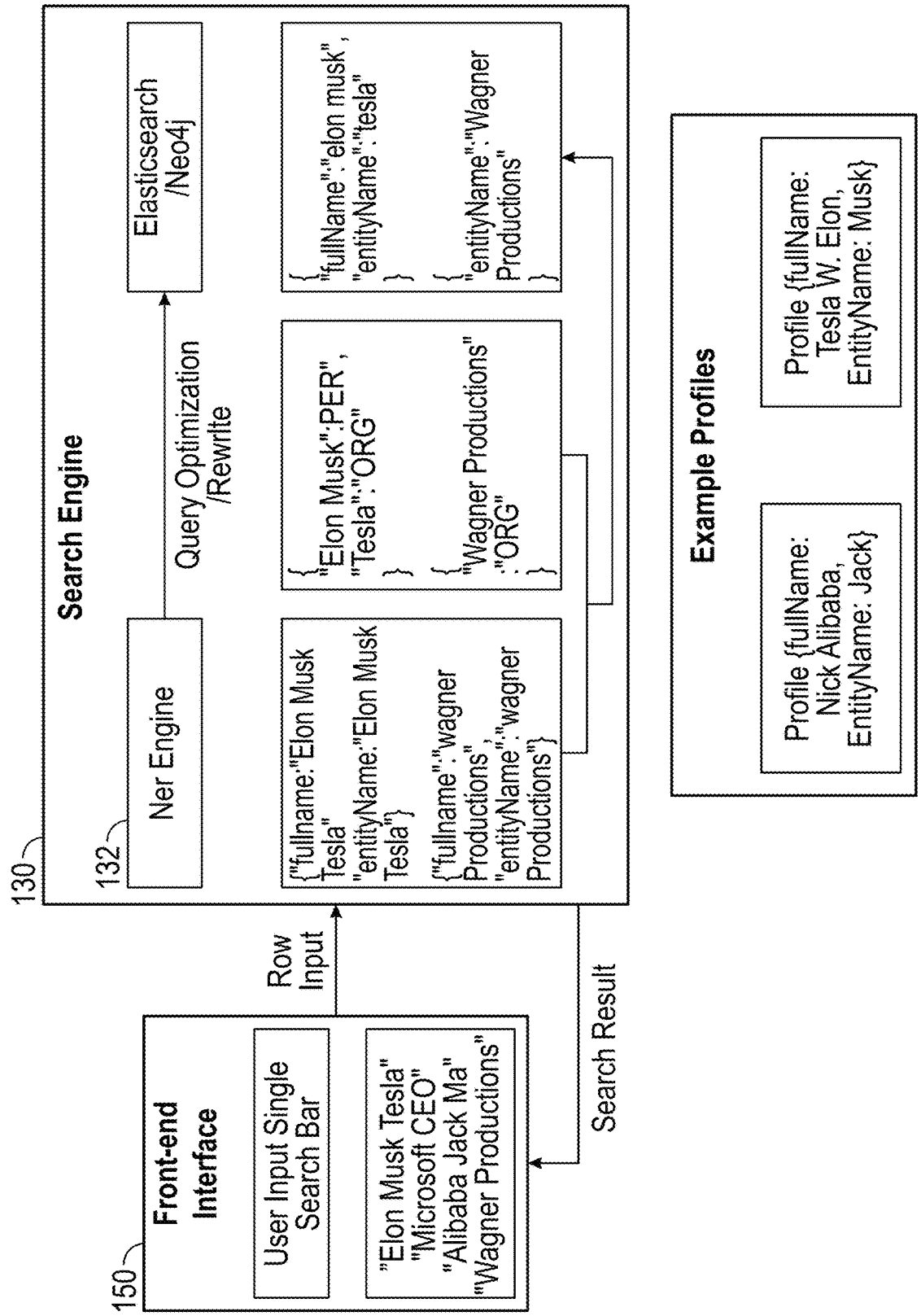
FIG. 10 shows an example diagram of an entity search engine according to embodiments described herein.

FIG. 10 shows an example diagram of an entity search engine according to embodiments described herein. In this example, the interface 150 has a user input search bar to receive search queries. For example, the search queries can be string or text based search queries. The interface 150 transmits the search queries to the entity search 130 engine as raw input data. The entity search 130 engine interacts with the entity recognition 132 engine to convert the raw input data (search query) into an optimized search query for the entity search 130 engine. The entity recognition 132 engine recognizes or identifies entities within the raw input data, and the types of entities. The entity recognition 132 engine converts the raw input data into an optimized search query of entity names and entity types. The entity names can include both individual names and organization names. The entity search 130 engine runs the optimized search query on the database and generates matching profiles. The entity search 130 engine returns the search results to the interface 150 to generate visualizations for data from the profiles.

As an illustrative example, the interface 150 can optimize an advisor's process in searching for prospects and new opportunities by providing visualizations of data showing different degrees of connections between existing clients. The system 100 can identify and pinpoint areas of referral based on client-to-client profiles and generate visualizations at interface 150 that can intuitively and accurately allow advisors to differentiate between varying degrees of connections along the way.

Visual representations of a network can be accurate but overcomplicated, and the interface 150 can provide visualizations to differentiate relationships and represent connections in different ways. The visualization of a subset of relevant data can be intuitively understood and overcome potential for over-complication by providing subset of relevant data. The system 100 provides an intuitive network representation and user experience. The system 100 and interface 150 can grant the user helpful controls on how they explore the network; promoting interactivity. The interface 150 can provide a visualization so that first-degree connections are easy to identify. The interface 150 can provide separate networks based on a larger subset domain (family, professional, etc.).

Network representations can consist of a composition of elements, the node and the link or edge. The node is some point or entity that represents some data or information, and the link or edge is the component, typically a line, which establishes a relationship between two or more nodes.

A network representation can be divided into three categories; centralized, decentralized, and distributed. Each representation has benefits and downsides, and there can be composite and hybrid network based on different attributes.

As stated in its name, the centralized network has an inherent focus on one particular node as a "starting point" or "origin" by which other secondary nodes extend from. This example network can place a client being (an entity) at the center, whereby all the links to their connections are clear and intuitive. However, high net worth individuals can possess high-volume and complex networks, and a centralized representation alone may be insufficient for visualizing past basic insights. In that instance, there are alternatives that can produce a level of understanding.

The decentralized network can demonstrate aspects of centrality. Essentially, the decentralized network is an aggregation of multiple centralized networks whereby each centralized network becomes a nested node within the decentralized composition. What elevates this typology over that of the centralized network is that there is greater opportunity for establishing hierarchy; increasing or decreasing levels of connection. At the same time, it still preserves a clear and digestible manner of presentation. An expense taken from a centralized to decentralized representation is that the emphasis on an origin becomes omitted, and the potential for exponential complexity arises.

Unlike either of the centralized or decentralized typologies, a distributed network presents nodes equally under the pretense of mutual connectivity; whereby each node is essentially linked to one another. This style of representation can be respective of the true nature of the behaviour of real-world networks and connections between people. For example, industries like finance are so dependent on fostering strong networks, a cohesive hierarchy of separate person A to person B connections may not exist. Moreover, a distributed network allows for a large quantity of data to be displayed as hierarchical formatting is not a primary consideration.

While its benefits may align with real-world behavior, this style of representation, even with small sized networks, can become overcomplicated. With no clear hierarchical structure, the level of intuition may be proportional to the amount of time an individual spends trying to understand it. It will likely pose more pain points to the target user, as well as cause development impediments.

Figure 11:
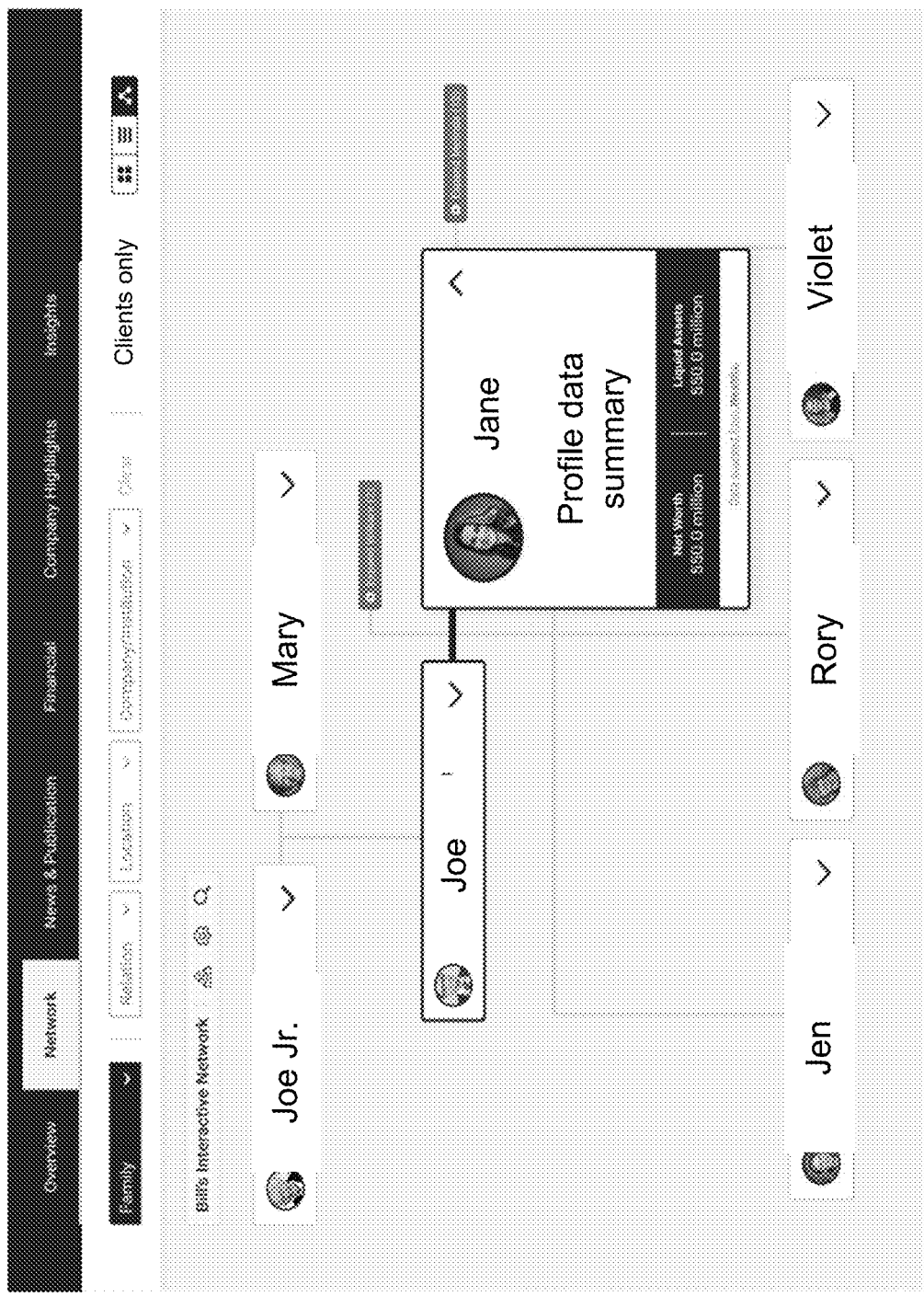
FIG. 11 shows an example diagram of an interactive network of interface according to embodiments described herein.

FIG. 11 shows an example diagram of an interactive network of interface 150 according to embodiments described herein.

The interface 150 can provide an interactive network visualization for producing reliable, trustworthy, and timely results. The interface 150 can adopt intuition, practicality and a clear sense of hierarchy in how it behaves.

The interactive network is a visual representation that presents a deeper level of intuition to where the user can naturally begin to interact with the network itself using the interface 150. The interface 150 can present a level of intuition and control to advisors to engage features of the system 100. The interface 150 can present advantages that a sorted/filtered list otherwise cannot.

For user experience, the interface 150 can provide a clear visual hierarchy of visual elements, especially where the potential for complexity exists. In some embodiments, the interface 150 can provide an interactive network that can abide by the concept of Fitt's Law; whereby the time to understand and acquire an element is a function of the distance to and size of such element. In other words, an entity's first-degree connections must be easily identifiable in the visualization, with those of the second and third degree descending in that order. An example of hierarchical application in action would be presenting a client's family network, where generations are the order-determining factor. In all, some form of structure needs to be able to define the flow of profiles in the network.

The interactive network can be practical in the sense that it can provide additional benefits that a traditional list cannot. It can be both digestible and augmentative for future engagements.

The interface 150 can have a "Network" tab on a given client's profile. The user then would access an updated interface 150 by clicking on the "Open Interactive Network" button. The interface 150 can display each profile as its own node that is connected by a series of links. As an example, the interface 150 can display a Family Network, which follows a top to down flow from oldest generation to newest. The interface 150 can present the user with the first-degree of closest familial connections to the client, to which the user themselves could click on the "Expand Tree" button if they wanted to explore the next degree.

When a user wants to find out more information about a certain profile, they can click on the profile node of the graph (interactive network) in the visualization of the interface 150. The interface 150 can update the interactive network to reveal a sidebar with preliminary information that would present the advisor with the most relevant information to them at first glance or first impression.

In addition, the interface 150 can highlight the path taken to reach the profile from the client. This can assist in highlighting and revealing noteworthy connection touchpoints, especially in network structures of high net worth individuals that would have otherwise been lost in a list.

While members of a client's family are ideal candidates of referral given their strong relationships, a business professional can have an expansive and perhaps enriched professional network of people they have worked alongside. The interface 150 with the interactive network can also features a "Professional Network" visualization, accessible by the dropdown.

The Family Network can be more of a centralized organization. The Professional Network can be a Decentralized representation and organizational style. In some example, the client can remain at the center of the interactive network, and there can be other major nodes that present information on a company or institution which can be viewed as larger junction points to where a client's network becomes more refined.

Similarly to how an "Expand Tree" button of interface 150 behaved, by clicking on an "Expand Node" button underneath each company/institution node, the interface 150 can update to show a view of a sub-network of individuals that have all had past experiences with the client and the company or institutions.

Upon clicking on any of the profiles, a sidebar of preliminary information can be revealed and the path of the connection can put focus on the given path it took to get from the client to a prospect profile.

In this example, the flow of navigating the interactive network of the interface 150 can be broken down into three stages; prior to opening the interface, exploring the interface, and gathering information for prospecting.

As another example, the system 100 can provide an interface 150 with a "Network" tab that generates a visualization of the interactive network. Further, the interface 150 can have an expandable card to display information.

Additional features of the interface 150 include being able to expand and collapse certain areas of the network, and highlighting the path that it takes to get from client node to prospect node and being able to pick up useful touchpoints along the way that otherwise would not have been easy to find in a list. The interface 150 can present the users with a space in which they are free to navigate by themselves; as the workflows and the way they conduct research and prospecting vary.

The system 100 has an advanced back-end search query knowledge graph (see FIGS. 3 and 4). There are a few visual parallels between the knowledge graph and the interactive network. Most evidently, there is the presence of nodes and links in the knowledge graph and the interactive network. The nodes themselves, especially when compared to the interactive professional network, can be seen to be containing data on both profiles/identification/names, and information regarding other categories, like company/institution. The knowledge graph adds an additional layer of complexity with nodes that contain information regarding interests. The interactive network may not account for interest as a sub-category in some embodiments. However in some embodiments, the knowledge graph can take a hybrid network representation, where some elements appear to be decentralized, and some appear to be distributed. This can be the result of the network combining both familial and professional relationships into a single space.

The knowledge graph has the capability to go in-depth on a client's network, it can be overwhelming in the sense that there may be no visual or structural hierarchy. The differentiation of nodes can be for the purpose of distinguishing a profile and some other category of information. Moreover, there can be irrelevant dead-ends to the knowledge graph network that in the back-end might serve an important purpose, but in the front-end present information that could otherwise be condensed or left out altogether.

For example, the client node can extend to several endpoint nodes that contain information to where the client went to school, or has worked before. This may poses no additional benefit for some users (such as advisors) as there may be no other prospects connected to these nodes; there may be nothing to explore in regards to an actual network discovery.

Additionally, another difference between the representation of the knowledge graph in comparison to the interactive network are the moments where links overlap. While this may be an efficient method of organizing information in a network, and representative of the behavior of networks in real life, it can pose user experience issues if the organization of these nodes and links are not further considered. A probable cause can be the nature of order in which these nodes are linked to other nodes. For example, profile nodes have links that end at "New York," which visually speaking, brings heavy emphasis onto the topic of the location itself rather than the people residing in it. A solution of the interactive network is to structure the data in such a way that a larger category, say "New York" becomes the sub-origin to other individual profiles. This way, attention is still called to "New York," as an important location within a sample client's network, but also leads advisors to finding prospects rather than a location.

In addition to granting useful control and intuitive visual representation of a client's network, the interactive network can reveal valuable touchpoints between clients to prospect connections. The diverse capabilities and dataset organization that the back-end knowledge graph can offer, in additional to the similarities it already has with the interactive network prove that they can work hand-in-hand. Essentially, a further iteration of the interactive network can offer concrete categorization rules that can be applied to data gathered from the knowledge graph, such that it can intuitively sort profiles under centralized category nodes; offering network exploration that can be both linear and non-linear depending on the user. The rules can also contribute to a visual design refinement, adding onto the level of intuition that the interactive network can offer.

Figure 12:
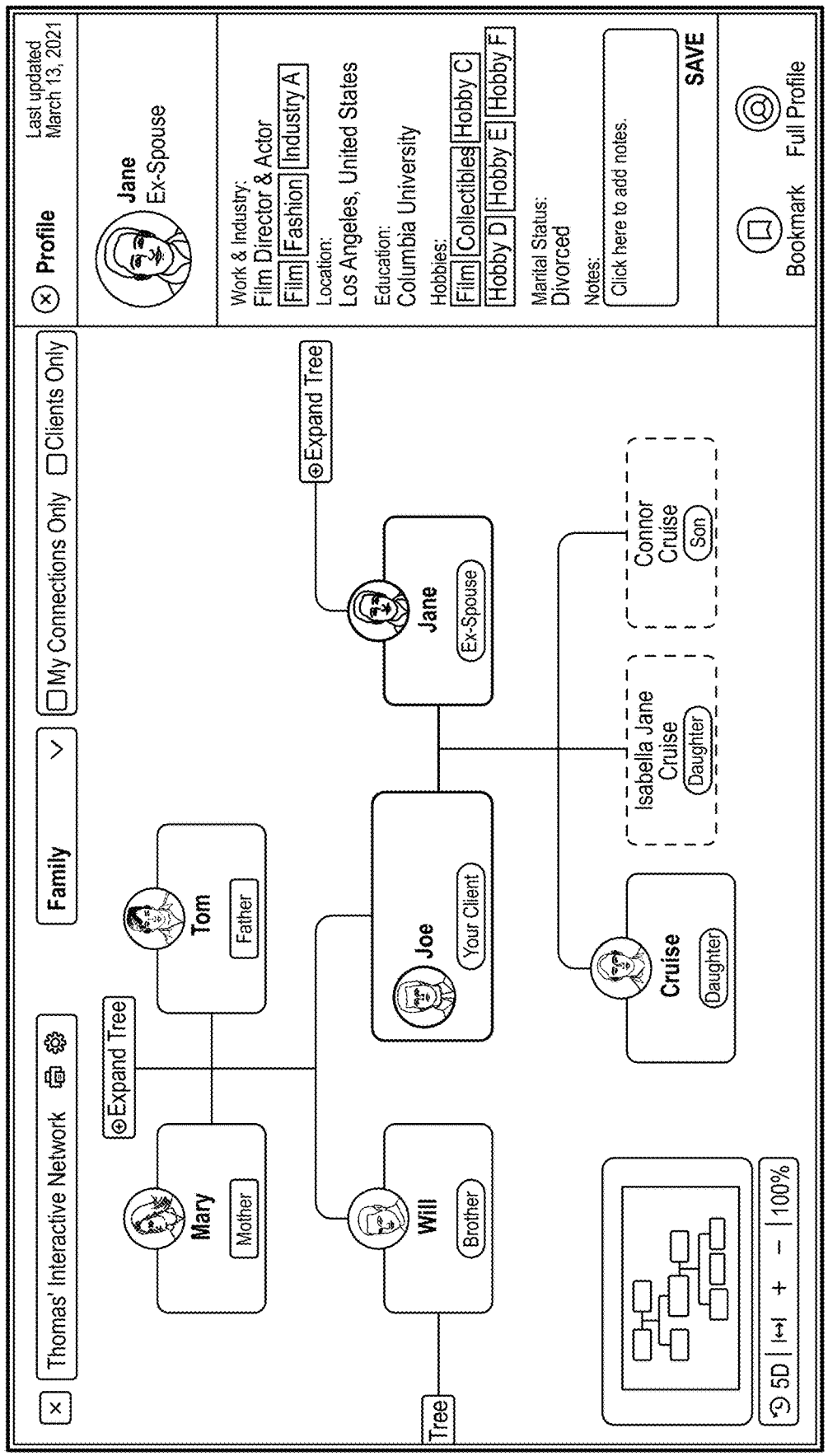
FIG. 12 shows an example diagram of an interactive network of interface according to embodiments described herein.

FIG. 12 shows an example diagram of an interactive network of interface 150 according to embodiments described herein. In this example, the interactive network is Family Network representation.

The interface 150 can provide an interactive network visualization with different selectable visual elements to receive control commands. The interface 150 can have a "Network" tab on a given client's profile. The user then would access an updated interface 150 by clicking on the "Open Interactive Network" button. The interface 150 can display each profile as its own node that is connected by a series of links.

In this example, the interface 150 can display a Family Network, which follows a top to down flow from oldest generation to newest. The interface 150 can present the user with familial connections to the client, to which the user themselves could click on the "Expand Tree" button if they wanted to explore the next degree.

When a user wants to find out more information about a certain profile, they can click on the profile node of the graph (interactive network) in the visualization of the interface 150. The interface 150 can update the interactive network to reveal a sidebar with preliminary information that would present the advisor with the most relevant information to them at first glance or first impression.

In addition, the interface 150 can highlight the path taken to reach the profile from the client. This can assist in highlighting and revealing noteworthy connection touchpoints, especially in network structures of high net worth individuals that would have otherwise been lost in a list.

Figure 13:
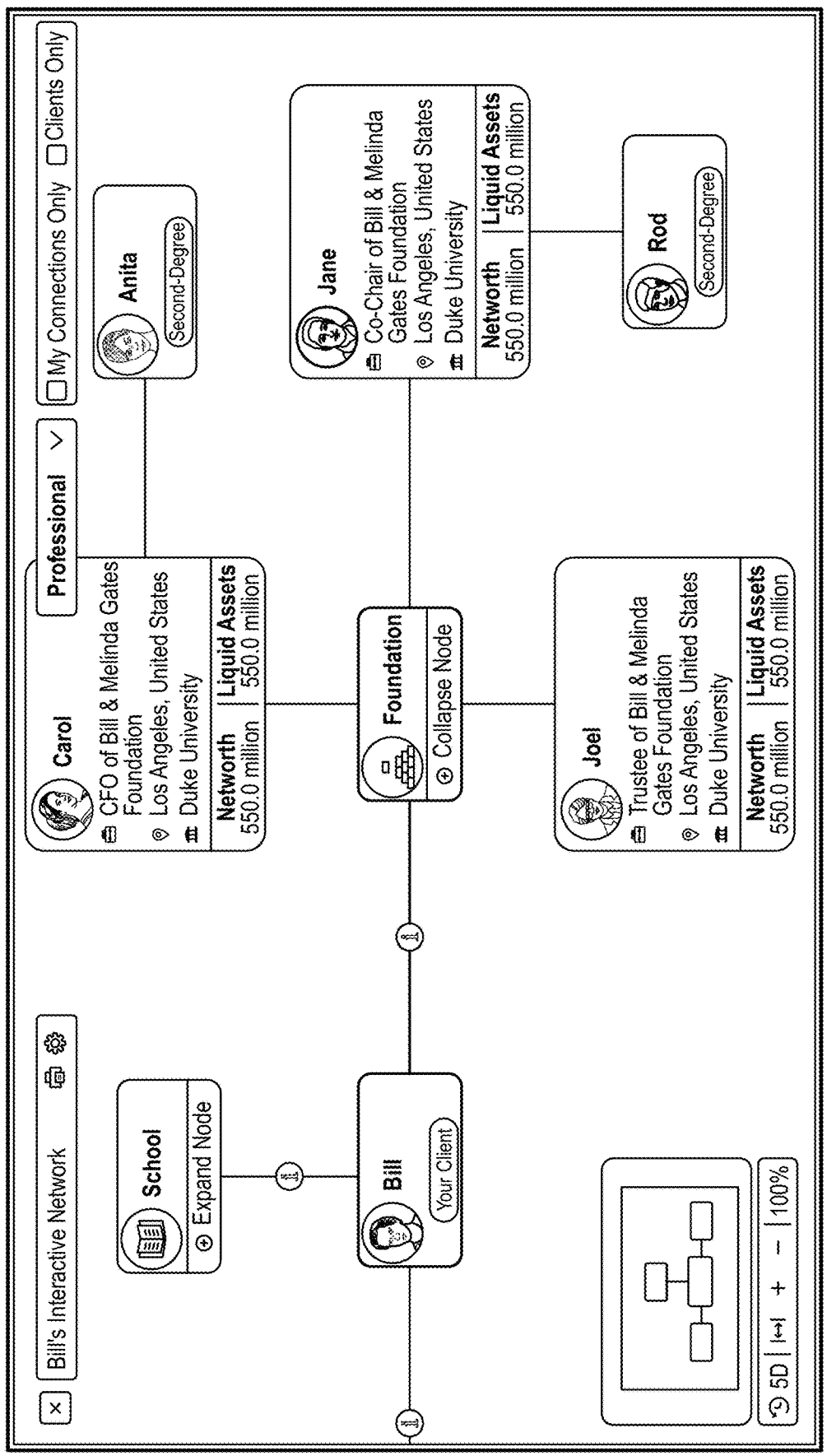
FIG. 13 shows an example diagram of an interactive network of interface according to embodiments described herein.

FIG. 13 shows an example diagram of an interactive network of interface 150 according to embodiments described herein. In this example, the interactive network is a Professional Network representation or visualization, accessible by the dropdown.

The Professional Network can be a Decentralized representation and organizational style. In some example, the client can remain at the center of the interactive network, and there can be other major nodes that present information on a company or institution which can be viewed as larger junction points to where a client's network becomes more refined.

Similarly to how an "Expand Tree" button of interface 150, by clicking on an "Expand Node" button underneath each company/institution node, the interface 150 can update to show a view of a sub-network of individuals that have all had past experiences with the client and the company or institutions.

Upon clicking on any of the profiles, a sidebar of preliminary information can be revealed and the path of the connection can put focus on the given path it took to get from the client to a prospect profile.

Figure 14:
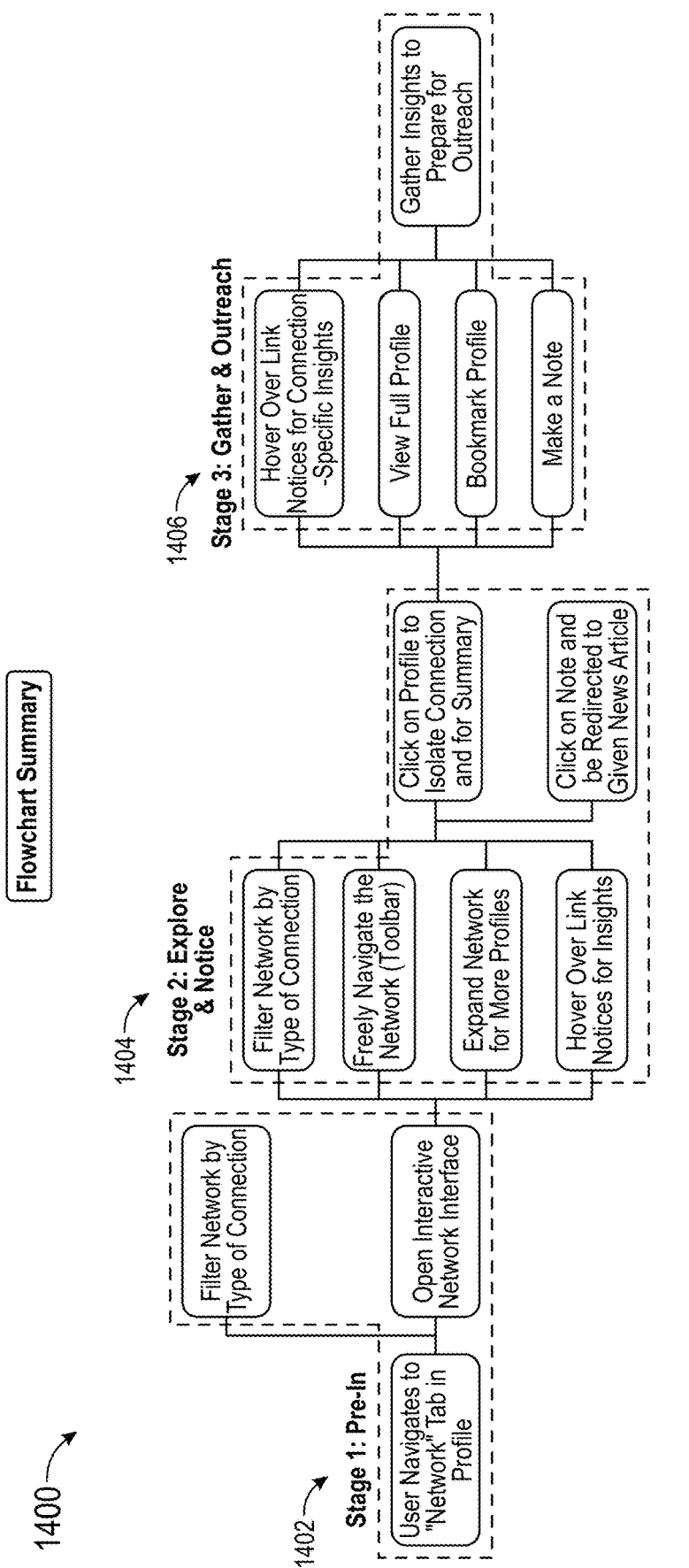
FIG. 14 shows an example diagram of an interactive network process according to embodiments described herein.

FIG. 14 shows an example diagram of an interactive network process according to embodiments described herein. In this example, the flow of navigating the interactive network of the interface 150 can be broken down into three stages; stage one 1402 prior to opening the interface, stage two 1404 exploring the interface, and stage three 1406 gathering information for prospecting.

For stage one 1402, the user navigates to the "network" tab in the profile shown on interface 150. The system 100 can open the Interactive Network on the interface 150. The system 100 can filter network by type of connection.

For stage two 1404, the user can explore the Interactive Network on the interface 150. The system 100 can filter by type of connection. The system 100 can enable the user to freely navigate to the network toolbar. The system 100 can expand the network for more profiles. The user can hover over a link and the interface 150 can update to show insights for nodes. The system 100 can detect a click or selection of a profile to isolate its connections and update interface 150 to display a summary of the profile.

For stage three 1406, the system 100 gathers additional data and transmit messages to other systems. The system 100 can update the interface 150 to display connection specific insights, display the full profile, display a bookmark profile, make note elements, and so on.

Accordingly, referring back to FIG. 1, embodiments described herein provide a system 100 for real-time profile search for web services. The system 100 provides an Interactive Network on interface 150 using the search results. The system 100 has a memory 108 storing data records, a data aggregation 126 service having a matching model to aggregate multiple sources of data into the data record, an entity recognition 132 service to classify entity types, an entity search 130 engine to retrieve data records for entities. The processor 104 generates a knowledge graph of nodes and edges representing connections between entities for storage a database 112 of memory 108 or data storage 110.

The system 100 has the processor 104 coupled to the memory with instructions for an interface 150 to display a real-time profile for an entity with visual elements extracted from the data record. The processor 104 executes instructions to determine whether a set of data sources refers to the entity using the entity recognition 132 service and the search engine and aggregate the set of data sources to populate the data record using the data aggregation 126 service having the matching model. The processor 104 pre-processes the consolidated data and prepares the data for the search 130 engine. The processor 104 executes a computer application for path traversal in the knowledge graph (of database 112) to discover a path to connect to the entity using ranking code, and updates the interface 150 with a visual element corresponding to at least a portion of the path.

In some embodiments, the interface 150 receives a name query, and the processor 104 computes the entity and the set of data sources using the name query and the matching model. The name query can include different name attributes, for example.

In some embodiments, the processor 104 locates a first data set result and a second data set result from the set of data sources using the name query. The processor 104 prompts the interface for a supplemental query, and generates the data record using the supplemental query and the matching model.

In some embodiments, the processor 104 uses data aggregation 126 logic or code to consolidate results generated by the matching model to populate the profile with the consolidate results.

In some embodiments, the processor 104 locates a first data set result and a second data set result from the set of data sources and populates the data record using data extraction from the first data set result and the second data set result, field mapping of a field from the first data set result and another field from the second data set result, and entity matching by merging values from the first data set result and the second data set result.

In some embodiments, the processor 104 determines whether the set of data sources refer to the entity and aggregates the set of data sources to populate the data record by extracting a first data record from a first data source and a second data record from a second data source, mapping the first data record and the second data record using the matching model, and merging a portion of the first data record and a portion of the second data record to populate the data record.

In some embodiments, the processor 104 reads the consolidated data record and selects the fields which contains personal identification information for further processing.

In some embodiments, the processor 104 implements a language-specific analyzer to tokenize all text within selected data fields and generates a terms list for each single document.

The terms list is then used to build an in-memory inverted index which provides a mapping from terms to documents.

In some embodiments, the processor 104 pre-processes user's input in natural language, recognizes the entity type for each term in the search query, and converts the search query to database query for the search engine.

In some embodiments, the processor 104 computes the relevance score in real-time by matching the search terms and inverted index, and ranks the documents by a modified TF-IDF score.

In some embodiments, the processor 104 decides all candidate entities base on relevance score ranking and returns data containing all information for further demonstration.

In some embodiments, the processor 104 generates the visual element corresponding to at least the portion of the path by computing a knowledge graph of nodes and edges, the edges defining types of connections between the nodes for use by the ranking code to generate the path.

Embodiments described herein provide a process for populating an interface with real-time profile results and improved visualizations with an Interactive Network. The system 100 can hardware components to implement acts or operations of the process. The process involves: storing data records and a matching model in memory 108; classifying entity types using the processor 104 executing instructions to determine whether a set of data sources refers to the entity using, and using a search 130 engine to retrieve entities and a knowledge graph of nodes and edges representing connections between entities. The knowledge graph can be used to extract data for populating an Interactive Network of the interface. The process involves the processor 104 aggregating multiple sources of data into the data record and the processor 104 accessing the memory to process a real-time search query to generate the knowledge graph of nodes and edges representing connections between entities. The process involves storing the knowledge graph in the memory 108. The process involves rendering visualizations of an Interactive Network on the interface 150 to display a real-time profile with visual elements extracted from the data record. The process involves using the processor 104 executing instructions to determine whether a set of data sources refer to an entity and aggregate the set of data sources to populate the data record using the matching model of data aggregation 126 code. The process involves the processor 104 executing a computer application for path traversal in the knowledge graph to discover a path to connect to the entity using ranking code; and updating the interface with a visual element corresponding to at least a portion of the path.

In some embodiments, the process further involves the processor 104 receiving a name query from the interface 150 and using the processor 104 to compute the entity and the set of data sources using the name query and the matching model.

In some embodiments, the process further involves the processor 104 locating a first data set result and a second data set result from the set of data sources using the name query; updating with prompts at the interface for a supplemental query, and generating the data record using the supplemental query and the matching model.

In some embodiments, the process further involves the processor 104 using real-time data aggregation 126 logic to consolidate results generated by the matching model to populate the real-time profile with the consolidated results and displaying the updated data at interface 150 as part of an Interactive Network.

In some embodiments, the process further involves the processor 104 locating a first data set result and a second data set result from the set of data sources and populates the data record using data extraction from the first data set result and the second data set result, field mapping of a field from the first data set result and another field from the second data set result, and entity matching by merging values from the first data set result and the second data set result.

In some embodiments, the process further involves the processor 104 determining whether the set of data sources refer to the entity and aggregating the set of data sources to populate the data record by extracting a first data record from a first data source and a second data record from a second data source, mapping the first data record and the second data record using the matching model, and merging a portion of the first data record and a portion of the second data record to populate the data record.

In some embodiments, the process further involves the processor 104 generating the visual element corresponding to at least the portion of the path by computing a knowledge graph of nodes and edges, the edges defining types of connections between the nodes for use by the ranking code to generate the path.

In some embodiments, the process further involves the processor 104 processing user's input in natural language, recognizing the entity type for each term in the search query, and converting the search query to database query for the search engine.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

What is claimed is:

1. A system for real-time profile search for web services, the system comprising:
    a memory storing a data record about an entity, a data aggregation service having a matching model to aggregate multiple sources of data into the data record about the entity, an entity recognition service to classify entity types, a search engine to retrieve entities, and a knowledge graph of nodes representing the entities and edges representing connections between the entities;
    a processor coupled to the memory with instructions for an interface to display a real-time profile for the entity as a node connected to a series of edges representing connections to profiles of the entities in an interactive network of visual elements extracted from the data record about the entity based on data from the knowledge graph, the processor executing instructions for conducting a real-time search and retrieval by processing a search query of raw input data to convert the raw input data into an optimized search query of an entity name and entity type using the entity recognition service, identify and retrieve a set of data records from a set of data sources that refer to the entity using the search engine and the optimized search query, and aggregate the set of data sources to combine the set of data records for the entity to populate the interactive network of the interface and populate the data record about the entity using the data aggregation service having the matching model, wherein the processor executes a profile matching code that can be used to determine whether the data from each of the set of data sources refers to the same entity by extracting data from the set of data sources, mapping fields from the extracted data to fields in a defined shared schema, and performing string matching to check for matches between the fields in the shared schema using a heuristic to determine exactitude of the matches, wherein the processor pre-processes the consolidated data and prepares the data for the search engine; and
    the processor executing a computer application for path traversal in the knowledge graph to discover a path to connect to the entity using ranking code, and updating the interface with a visual element corresponding to at least a portion of the path using the knowledge graph, the at least portion of the path comprising a set of nodes connected by edges representing connections to profiles of the entities as part of the interactive network of visual elements, wherein the interactive network provides a visual hierarchy of the visual elements extracted from the data record identifying entities with first-degree connections to the entity,
    wherein the interactive network comprises categorization rules that are applied to data extracted from the knowledge graph to sort the real-time profile for the entity under centralized category nodes of the interactive network.

2. The system of claim 1 wherein the interface receives a name query, wherein the processor computes the entity and the set of data sources using the name query and the matching model.

3. The system of claim 2 wherein the processor locates a first data set result and a second data set result from the set of data sources using the name query, wherein the processor prompts the interface for a supplemental query, and generates the data record using the supplemental query and the matching model.

4. The system of claim 1 wherein the processor uses data aggregation logic to consolidate results generated by the matching model to populate the profile with the consolidate results.

5. The system of claim 1 wherein the processor locates a first data set result and a second data set result from the set of data sources and populates the data record using data extraction from the first data set result and the second data set result, field mapping of a field from the first data set result and another field from the second data set result, and entity matching by merging values from the first data set result and the second data set result.

6. The system of claim 1 wherein the processor determines whether the set of data sources refer to the entity and aggregates the set of data sources to populate the data record by extracting a first data record from a first data source and a second data record from a second data source, mapping the first data record and the second data record using the matching model, and merging a portion of the first data record and a portion of the second data record to populate the data record.

7. The system of claim 1 wherein the processor reads the consolidated data record and selects the fields which contains personal identification information for further processing.

8. The system of claim 1 wherein the processor implements a language-specific analyzer to tokenize all text within selected data fields and generates a terms list for each single document, the terms list is then used to build an in-memory inverted index which provides a mapping from terms to documents.

9. The system of claim 1 wherein the processor pre-processes user's input in natural language, recognizes the entity type for each term in the search query, and converts the search query to database query for the search engine.

10. The system of claim 1 wherein the processor computes the relevance score in real-time by matching the search terms and inverted index, and ranks the documents by a modified TF-IDF score.

11. The system of claim 1 wherein the processor decides all candidate entities base on relevance score ranking and returns data containing all information for further demonstration.

12. The system of claim 1 wherein the processor generates the visual element corresponding to at least the portion of the path by computing a knowledge graph of nodes and edges, the edges defining types of connections between the nodes for use by the ranking code to generate the path.

13. The system of claim 1 wherein the processor conducts the real-time search and retrieval by making synchronous real-time applicant programming interface calls to the search engine which interacts with the memory storing the set of data sources.

14. A process for populating an interface with real-time profile results and improved visualizations, the process comprising:
 storing data records and a matching model in memory, the data records comprising a data record about an entity;
 conducting a real-time search and retrieval by processing a real-time search query of raw input data using a processor executing instructions to convert the raw input data into an optimized search query of an entity name and entity type using the entity recognition service, identify a set of data sources that refer to the entity using a search engine and the optimized search query, and to retrieve the set of data sources that refer to the entity;
 aggregating multiple sources of data into the data record using the processor accessing the memory to process a real-time search query to generate a knowledge graph of nodes and edges representing connections between entities;
 storing the knowledge graph in the memory;
 rendering visualizations on an interface to display a real-time profile for the entity as a node connected to a series of edges representing connections to profiles of the entities in an interactive network of with-visual elements extracted from the data record about the entity based on data from the knowledge graph, using the processor executing instructions to aggregate the set of data sources that refer to the entity to populate the interactive network of the interface and to populate the data record about the entity using the matching model, wherein the processor executes a profile matching code that can be used to determine whether the data from each of the set of data sources refers to the same entity by extracting data from the set of data sources, mapping fields from the extracted data to fields in a defined shared schema, and performing string matching to check for matches between the fields in the shared schema using a heuristic to determine exactitude of the matches;
 executing a computer application for path traversal in the knowledge graph to discover a path to connect to the entity using ranking code; and
 updating the interface with a visual element corresponding to at least a portion of the path using the knowledge graph, the at least portion of the path comprising a set of nodes connected by edges representing connections to profiles of the entities as part of the interactive network of visual elements, wherein the interactive network provides a visual hierarchy of the visual elements extracted from the data record identifying entities with first-degree connections to the entity,
 wherein the interactive network comprises categorization rules that are applied to data extracted from the knowledge graph to sort the real-time profile for the entity under centralized category nodes of the interactive network.

15. The process of claim 14 further comprising: receiving a name query from the interface at the processor to compute the entity and the set of data sources using the name query and the matching model.

16. The process of claim 14 further comprising: locating a first data set result and a second data set result from the set of data sources using the name query; updating with prompts at the interface for a supplemental query, and generating the data record using the supplemental query and the matching model.

17. The process of claim 14 further comprising: using real-time data aggregation logic to consolidate results generated by the matching model to populate the real-time profile with the consolidated results.

18. The process of claim 14 further comprising: locating a first data set result and a second data set result from the set of data sources and populates the data record using data extraction from the first data set result and the second data set result, field mapping of a field from the first data set result and another field from the second data set result, and entity matching by merging values from the first data set result and the second data set result.

19. The process of claim 14 further comprising: determining whether the set of data sources refer to the entity and aggregating the set of data sources to populate the data record by extracting a first data record from a first data source and a second data record from a second data source, mapping the first data record and the second data record using the matching model, and merging a portion of the first data record and a portion of the second data record to populate the data record.

20. The process of claim 14 further comprising: generating the visual element corresponding to at least the portion of the path by computing a knowledge graph of nodes and edges, the edges defining types of connections between the nodes for use by the ranking code to generate the path.

21. The process of claim 14 further comprising: processing user's input in natural language, recognizing the entity type for each term in the search query, and converting the search query to database query for the search engine.

\* \* \* \* \*